United States Patent
Tamagawa

(10) Patent No.: US 9,360,707 B2
(45) Date of Patent: Jun. 7, 2016

(54) IPS MODE LIQUID CRYSTAL DISPLAY DEVICE

(71) Applicant: Konica Minolta, Inc., Tokyo (JP)

(72) Inventor: Minori Tamagawa, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 22 days.

(21) Appl. No.: 14/366,146

(22) PCT Filed: Sep. 19, 2012

(86) PCT No.: PCT/JP2012/073930
§ 371 (c)(1),
(2) Date: Jun. 17, 2014

(87) PCT Pub. No.: WO2013/094263
PCT Pub. Date: Jun. 27, 2013

(65) Prior Publication Data
US 2014/0362330 A1    Dec. 11, 2014

(30) Foreign Application Priority Data
Dec. 19, 2011   (JP) ................................. 2011-277408

(51) Int. Cl.
| | | |
|---|---|---|
| *G02F 1/13363* | (2006.01) | |
| *G02B 5/30* | (2006.01) | |
| *G02F 1/1343* | (2006.01) | |
| *G02F 1/1335* | (2006.01) | |

(52) U.S. Cl.
CPC .......... *G02F 1/133634* (2013.01); *G02B 5/305* (2013.01); *G02B 5/3083* (2013.01); *G02F 1/133528* (2013.01); *G02F 1/134363* (2013.01); *G02F 2413/13* (2013.01); *G02F 2413/14* (2013.01)

(58) Field of Classification Search
CPC ..................... G02F 1/134363; G02F 1/133634
See application file for complete search history.

(56) References Cited

U.S. PATENT DOCUMENTS

| | | | | |
|---|---|---|---|---|
| 2009/0153782 A1* | 6/2009 | Fukagawa | ............ | G02B 5/3083 349/96 |
| 2010/0222567 A1* | 9/2010 | Otoshi | .................... | B29C 41/28 536/69 |
| 2011/0128478 A1* | 6/2011 | Yamada | .................. | B32B 23/08 349/96 |
| 2011/0151146 A1* | 6/2011 | Okano | ....................... | C08J 7/04 428/1.33 |
| 2011/0183149 A1* | 7/2011 | Kang | ......................... | C08J 5/18 428/473.5 |
| 2011/0315297 A1* | 12/2011 | Koshio | .................. | G02F 1/1309 156/64 |

FOREIGN PATENT DOCUMENTS

| | | |
|---|---|---|
| JP | 2003-043262 A | 2/2003 |
| JP | 2003-161833 A | 6/2003 |
| JP | 2007017958 A | 1/2007 |
| JP | 2008268913 A * | 11/2008 |
| JP | 2009-053292 A | 3/2009 |
| JP | 2011-107180 A | 6/2011 |

OTHER PUBLICATIONS

PCT/JP2012/073930 International Preliminary Report on Patentability and Written Opinion in English and Japanese, date of issuance: Jun. 24, 2014. 11 pages).
Notification of Reasons for Refusal; Patent Application No. 2013-550158 dated Feb. 9, 2016Jan. 29, 2016; total of 1 page; English translation of Notification of Reasons for Refusal; total of 1 page; Grand Total of 2 pages.

* cited by examiner

*Primary Examiner* — Michael Caley
*Assistant Examiner* — Edmond Lau
(74) *Attorney, Agent, or Firm* — Lucas & Mercanti, LLP

(57) ABSTRACT

With regard to an IPS liquid crystal display device in which a phase difference film is used as a polarizing plate protection film at the liquid crystal cell side of a polarizing plate, which is arranged at the viewing side of IPS liquid crystal cell, to provide a means for improving the re-workability of the phase difference film at production of the display device.
The IPS mode liquid crystal display device according to the present invention has an IPS mode liquid crystal cell and a first polarizing plate and a second polarizing plate, which sandwich the IPS mode liquid crystal cell. Further, the first polarizing plate is positioned at the viewing side of the liquid crystal cell and is provided from the viewing side with a first polarizing plate protection film, a polarizer, and a second polarizing plate protection film; the second polarizing plate is positioned at the reverse side from the viewing side of the liquid crystal cell and is provided from the viewing side with a third polarizing plate protection film, a polarizer, and a fourth polarizing plate protection film; the second polarizing plate protection film has a film thickness of 30 to 60 μm and has a structure resulting from laminating a first optically anisotropic layer, which contains a polymer having a positive intrinsic birefringence, and a second optically anisotropic layer, which contains a polymer having a negative intrinsic birefringence; and the film thickness of the first polarizing plate protection film, the third polarizing plate protection film, and the fourth polarizing plate protection film are each 10 to 30 μm.

14 Claims, No Drawings

IPS MODE LIQUID CRYSTAL DISPLAY DEVICE

CROSS REFERENCE TO RELATED APPLICATION

This Application is a 371 of PCT/JP2012/073930 filed on Sep. 19, 2012 which, in turn, claimed the priority of Japanese Patent Application No. JP2011-277408 filed on Dec. 19, 2011 both applications are incorporated herein by reference.

TECHNICAL FIELD

The present invention relates to an IPS mode liquid crystal display device.

BACKGROUND ART

As a liquid crystal display device type, so-called TN type, STN type, OCB type, HAN type, VA type (PVA type and MVA type), IPS type or the like are well known. Among them, the IPS (In-Plane Switching) mode liquid crystal display device (hereinbelow, also simply referred to as "IPS liquid crystal display device) has a liquid crystal cell having a liquid crystal layer and a pair of substrates which sandwich the liquid crystal layer, polarizing plates each arranged at both sides (that is, viewing side and back light side) of the liquid crystal cell. The IPS liquid crystal display device is now widely used for a portable device such as a tablet type display device or a smart phone. In an IPS liquid crystal display device, liquid crystal molecules that are contained in a liquid crystal layer for black display are oriented in parallel to the surface of a pair of substrates, and thus the IPS liquid crystal display device has an advantage of having excellent black display performance. The IPS liquid crystal display device also has an advantage of ensuring high viewing angle at certain level even without using a so-called optical compensation film (that is, viewing angle widening film). Meanwhile, there is a problem that, from the viewpoint of optical characteristics of a liquid crystal cell provided in the IPS liquid crystal display device, optical leak occurs when an image is viewed in tilt direction so that contrast of a display image is lowered.

In a liquid crystal display device, a phase difference film is generally used for the purpose of preventing a decrease in contrast. However, for further improving the performances, a phase difference film capable of responding to various optical designs is required. Further, it is more strongly required for a phase difference film mounted in a portable device like those described above to have thin film profile and light weight characteristics.

As a general method for producing a phase difference film, there is a method of producing a polymer film based on monoaxial stretching or biaxial stretching by using various stretching methods. However, because the phase difference exhibited by stretching is dependent on the optical characteristics of a polymer, there is a limit for controlling the exhibition of phase difference only by a stretching technique.

For a phase difference film used in an IPS liquid crystal display device, for example, it is required that "in-plane retardation (Ro) value is high and thickness-direction retardation (Rt) value is small." However, when a stretching treatment is performed for increasing the in-plane retardation (Ro) value, the thickness-direction retardation (Rt) value also increases so that it becomes difficult to produce a phase difference film simultaneously having desirable in-plane phase difference and desirable thickness-direction phase difference.

In this connection, a method of exhibiting a desired phase difference value by having a laminated phase difference film with constitution in which plural phase difference films are laminated has been suggested (see, Patent Literature 1). However, the laminated phase difference film has a problem in re-workability of a process of producing a liquid crystal display device. Specifically, there is a problem of having a great amount of production loss when an attached film is peeled and attached again or the like, because clean peeling is not achieved.

In this connection, for the purpose of improving the re-workability of a laminated phase difference film, a method of enlarging area of a film in contact with the opposite side of a liquid crystal cell is suggested (see, Patent Literature 2). According to this method, however, the peeling is easy at the beginning but it becomes difficult from the middle, and thus a problem of having peeling residues still remains unsolved.

CITATION LIST

Patent Literature

Patent Literature 1: Japanese Patent Application Laid-Open No. 2003-161833
Patent Literature 2: Japanese Patent Application Laid-Open No. 2003-43262

SUMMARY OF INVENTION

Technical Problem

In consideration of the aforementioned problems of a related art, the inventor of the present invention studied a constitution of an IPS liquid crystal display device in which a phase difference film is used as a polarizing plate protection film at the liquid crystal cell side of a polarizing plate, which is arranged at the viewing side of IPS liquid crystal cell. Further, with regard to an IPS liquid crystal display device having such constitution, improving the re-workability of a phase difference film as described above was set as a subject to achieve.

Specifically, an object of the present invention is, with regard to an IPS liquid crystal display device in which a phase difference film is used as a polarizing plate protection film at the liquid crystal cell side of a polarizing plate, which is arranged at the viewing side of IPS liquid crystal cell, to provide a means for improving the re-workability of the phase difference film at production of the display device.

Solution to Problem

In considerations of the object described above, the inventor of the present invention conducted intensive studies. As a result, it was found that the above problem can be solved by using a laminate film obtained by laminating optically anisotropic layers having positive and negative intrinsic birefringence, respectively, as a polarizing plate protection film at the liquid crystal cell side of a polarizing plate, which is arranged at the viewing side of the liquid crystal, and also by controlling film thickness of each of total four pieces of the polarizing plate protection film constituting the display device, and the present invention was completed accordingly.

Specifically, the object of the present invention is accomplished by the following constitution.

1. An IPS mode liquid crystal display device having an IPS mode liquid crystal cell and a first polarizing plate and a second polarizing plate, which sandwich the IPS mode liquid crystal cell, in which the first polarizing plate is positioned at the viewing side of the IPS mode liquid crystal cell and is provided from the viewing side with a first polarizing plate protection film, a polarizer, and a second polarizing plate protection film, the second polarizing plate is positioned at the reverse side from the viewing side of the IPS mode liquid crystal cell and is provided from the viewing side with a third polarizing plate protection film, a polarizer, and a fourth polarizing plate protection film, the second polarizing plate protection film has a film thickness of 30 to 60 µm and has a structure resulting from laminating a first optically anisotropic layer containing a polymer having a positive intrinsic birefringence, and a second optically anisotropic layer containing a polymer having a negative intrinsic birefringence, and the film thickness of the first polarizing plate protection film, the third polarizing plate protection film, and the fourth polarizing plate protection film are each 10 to 30 µm;

2. The IPS mode liquid crystal display device described in above 1, in which the second polarizing plate protection film satisfies, with regard to Ro and Rth each represented by the following Mathematical Formula (1) and Mathematical Formula (2), $$Ro=(nx-ny)\times d[\text{nm}] \quad \text{Mathematical Formula (1)}$$

$$Rth=\{(nx+ny)/2-nz\}\times d[\text{nm}] \quad \text{Mathematical Formula (2)}$$

(in the formulae, nx represents in-plane refractive index in the slow axis direction of the film, ny represents in-plane refractive index in the fast axis direction of the film, nz represents refractive index in the thickness direction of the film, and d represents the thickness (nm) of the film; the refractive index is measured at wavelength of 590 nm under environment of 23° C. and 55% RH)

the following relationship $$100 \leq Ro \leq 140$$

$$-40 \leq Rth \leq 0;$$

3. The IPS mode liquid crystal display device in above 1 or 2, in which the first optically an isotropic layer satisfies the following relationship with regard to Ro and Rth $$-10 \leq Ro \leq 10$$

$$80 \leq Rth \leq 120;$$

4. The IPS mode liquid crystal display device described in any one of above 1 to 3, in which the second optically anisotropic layer satisfies the following relationship with regard to Ro and Rth $$100 \leq Ro \leq 160$$

$$-140 \leq Rth \leq -80;$$

5. The IPS mode liquid crystal display device described in any one of above 1 to 4, in which the polymer having a positive intrinsic birefringence is a cellulose ester resin substituted with an acyl group with 2 to 4 carbon atoms, or an acyl group with 2 carbon atoms and an acyl group with 3 to 4 carbon atoms in which the total substitution degree of acyl group is between 1.0 and 2.4 and the total carbon atom number of the acyl substituent group is 4.4 or more;

6. The IPS mode liquid crystal display device described in any one of above 1 to 5, in which the first optically anisotropic layer contains an acryl polymer with weight average molecular weight (Mw) of 500 to 30000;

7. The IPS mode liquid crystal display device described in any one of above 1 to 6, in which the polymer having a negative intrinsic birefringence has a constitutional unit derived from a vinyl compound and a constitutional unit derived from an aromatic maleimide;

8. The IPS mode liquid crystal display device described in above 7, in which mass ratio between the constitutional unit derived from a vinyl compound and the constitutional unit derived from aromatic maleimide in the polymer having a negative intrinsic birefringence is 80:20 to 95:5 (constitutional unit derived from a vinyl compound:constitutional unit derived from an aromatic maleimide);

9. The IPS mode liquid crystal display device described in above 7 or 8, in which the aromatic maleimide contains N-phenylmaleimide;

10. The IPS mode liquid crystal display device described in any one of above 7 to 9, in which the vinyl compound contains styrene;

11. The IPS mode liquid crystal display device described in any one of above 1 to 10, in which each of the first polarizing plate protection film, the third polarizing plate protection film, and the fourth polarizing plate protection film contains a cellulose ester resin and/or an acrylic resin;

12. The IPS mode liquid crystal display device described in above 11, in which each of the first polarizing plate protection film, the third polarizing plate protection film, and the fourth polarizing plate protection film contains the acrylic resin and the cellulose ester resin at mass ratio of 95:5 to 30:70 (acrylic resin:cellulose ester resin) and also in a compatibilized state;

13. The IPS mode liquid crystal display device described in any one of above 1 to 12, in which each of the first polarizing plate protection film, the third polarizing plate protection film, and the fourth polarizing plate protection film satisfies, with regard to Ro and Rth each represented by the following Mathematical Formula (1) and Mathematical Formula (2):

$$Ro=(nx-ny)\times d[\text{nm}] \quad \text{Mathematical Formula (1)}$$

$$Rth=\{(nx+ny)/2-nz\}\times d[\text{nm}] \quad \text{Mathematical Formula (2)}$$

(in the formulae, nx represents in-plane refractive index in the slow axis direction of the film, ny represents in-plane refractive index in the fast axis direction of the film, nz represents refractive index in the thickness direction of the film, and d represents the thickness (nm) of the film; the refractive index is measured at wavelength of 590 nm under environment of 23° C. and 55% RH)

the following relationship $$-5 \leq Ro \leq 5$$

$$-5 \leq Rth \leq 5.$$

DESCRIPTION OF EMBODIMENTS

Hereinbelow, embodiments of the present invention are explained in detail.

One aspect of the present invention relates to an IPS mode liquid crystal display device having an IPS mode liquid crystal cell and a first polarizing plate and a second polarizing plate, which sandwich the IPS mode liquid crystal cell. The first polarizing plate is positioned at the viewing side of the liquid crystal cell and is provided from the viewing side with a first polarizing plate protection film, a polarizer, and a second polarizing plate protection film. The second polarizing plate is positioned at the reverse side from the viewing side of the liquid crystal cell and is provided from the viewing side with a third polarizing plate protection film, a polarizer, and a fourth polarizing plate protection film. Specifically, the IPS mode liquid crystal display device according to one embodiment of the present invention has the following constitution from the viewing side.

[First polarizing plate]
First polarizing plate protection film Polarizer
Second polarizing plate protection film
[IPS mode liquid crystal display cell]
[Second polarizing plate]
Third Polarizing plate protection film Polarizer;
Fourth polarizing plate protection film Further, at the reverse side from the viewing side of the fourth polarizing plate protection film, a backlight is generally arranged. Meanwhile, the technical scope of the present invention is not limited to the aforementioned modes, and it is obvious that other conventionally known members can be also included. Hereinbelow, the constitutional element of the IPS liquid crystal display device of the present embodiment is explained in greater detail.

[IPS Mode Liquid Crystal Cell]

In the IPS mode liquid crystal display device, the liquid crystal layer of a liquid crystal panel has homogeneous orientation which is parallel to the substrate surface in initial state, the director of the liquid crystal layer on a plane parallel to the substrate is either parallel or at certain angle to the electrode wiring direction with no applied voltage but, with the voltage application, the direction of the director of liquid crystal layer moves to the direction perpendicular to the electrode wiring direction accompanying the voltage application, and when the direction of the director of liquid crystal layer is tilted by 45° toward the electrode wiring direction compared to the director direction with no applied voltage, the liquid crystal layer with the voltage application rotates the azimuth of the polarized light by 90° like a ½ wavelength plate so that the transmission axis at outgoing side polarizing plate and the azimuth of the polarized light are in match to yield a white display.

Generally, thickness of a liquid crystal layer is constant. However, due to in-plane switching mode, it is believed that forming slight irregularities in the thickness of the liquid crystal layer may increase the rate of responding to switching. However, because such effect can be achieved at maximum level even for a case of having non-uniform thickness of the liquid crystal layer, it has little influence on a variation in thickness of the liquid crystal layer. Thickness of the liquid crystal layer is 2 to 6 µm, and preferably 3 to 5.5 µm. The liquid crystal display device according to the present embodiment may be used, in addition to use in a large-size liquid crystal television, in a portable device such as a tablet type display device or a smart phone.

Meanwhile, specifications of the IPS mode liquid crystal cell are not particularly limited, and it is also possible to carry out the present invention in view of other known technical disclosures of a related art (for example, Japanese Patent Application Laid-Open No. 2010-3060).

[Polarizing Plate (First Polarizing Plate and Second Polarizing Plate)]

The IPS liquid crystal display device according to this aspect has a polarizing plate at both surfaces of the liquid crystal cell. The first polarizing plate is a polarizing plate arranged at the viewing side of the liquid crystal cell, and it is provided from the viewing side with a first polarizing plate protection film, a polarizer, and a second polarizing plate protection film. Further, the second polarizing plate is a polarizing plate arranged at the reverse side from the viewing side of the liquid crystal cell and is provided from the viewing side with a third polarizing plate protection film, a polarizer, and a fourth polarizing plate protection film.

(Polarizer)

Polarizer is a main component of a polarizing plate and it is an element allowing transmission of light in a specific direction on a plane of polarization. The currently known most representative polarizer is a polyvinyl alcohol-based polarizing film, and there is a polyvinyl alcohol film stained with iodine and a polyvinyl alcohol film stained with a dichroic dye.

As a polarizer, those obtained by forming a film from an aqueous solution of polyvinyl alcohol and subjecting it to monoaxial stretching followed by dyeing or those obtained by dyeing and followed by monoaxial stretching and a durability treatment preferably with a boron compound can be used. Film thickness of the polarizer is preferably 5 to 30 µm, and particularly preferably 5 to 20 µm.

Further, ethylene-modified polyvinyl alcohol described in Japanese Patent Application Laid-Open No. 2003-248123, Japanese Patent Application Laid-Open No. 2003-342322, or the like, which has ethylene unit content of 1 to 4% by mol, polymerization degree of 2000 to 4000, and saponification degree of 99.0 to 99.99% by mol, is also preferably used. Among them, an ethylene-modified polyvinyl alcohol film having hot water cutting temperature of 66 to 73° C. is preferably used. The polarizer using this ethylene-modified polyvinyl alcohol film has an advantage that it has excellent polarization performance and durability performance and also has little color staining.

Meanwhile, each of the first polarizing plate and the second polarizing plate is provided with the polarizer, and constitution of those two polarizers may be the same or different from each other.

(First, Third, and Fourth Polarizing Plate Protection Film)

The first, third, and fourth polarizing plate protection films are not specifically limited as long as they have a film thickness of 10 to 30 µm. A polarizing plate protection film conventionally known in the field can be used as these polarizing plate protection films. In the present invention, if the film thickness of the polarizing plate protection film is less than 10 µm, shrinkage of the polarizer cannot be inhibited so that the polarizing plate may shrink more than necessary and heterogeneity may be caused by heat generated during panel lighting. On the other hand, if the film thickness of the polarizing plate protection film is more than 30 µm, balance in both surfaces of the panel may be deteriorated to yield a warped panel. Meanwhile, the film thickness of those polarizing plate protection films is preferably 15 to 25 µm, and more preferably 20 to 25 µm.

Meanwhile, constitution of the first, third, and fourth polarizing plate protection films may be the same or different from each other.

As these polarizing plate protection films, those containing one type or two or more types of cellulose ester resin, acrylic resin, or norbornene-based resin are used. A film containing those resins has various excellent properties required for a polarizing plate protection film such as transparency, heat resistance, and moisture resistance. Among them, an optical film containing the acrylic resin (A) and the cellulose ester resin (B) at mass ratio of 95:5 to 30:70 and also in a compatibilized state is used in a preferred embodiment. By having such constitution, recognizability of the display device can be improved. Hereinbelow, explanations are given with regard to such embodiment, but it is not limited to the embodiment described below.

The acrylic resin used in this embodiment includes a methacrylic resin. The resin is, although not particularly limited, preferably a resin consisting of 50 to 99% by mass of a methyl methacrylate unit and 1 to 50% by mass of other monomer unit co-polymerizable with it.

Examples of other co-polymerizable monomers include alkyl methacrylate having an alkyl group with 2 to 18 carbon atoms, alkyl acrylate having an alkyl group with 1 to 18 carbon atoms, α,β-unsaturated acid such as acrylic acid or methacrylic acid, divalent carboxylic acid containing an unsaturated group such as maleic acid, fumaric acid, or itaconic acid, an aromatic vinyl compound such as styrene or α-methylstyrene, α,β-unsaturated nitrile such as acrylonitrile or methacrylonitrile, maleic anhydride, maleimide, N-substituted maleimide, and glutaric anhydride, and they may be used either singly or in combination of two or more types of a monomer.

Among them, from the viewpoint of thermal decomposition resistance or fluidity of the copolymer, methyl acrylate, ethylacrylate, n-propylacrylate, n-butylacrylate, s-butyl acrylate, 2-ethylhexyl acrylate or the like are preferable, and methyl acrylate or n-butyl acrylate is particularly preferably used.

The acrylic resin (A) preferably has, from the viewpoint of improving brittleness as an optical film and improving transparency when compatibilized with the cellulose ester resin (B) in particular, weight average molecular weight (Mw) of 80000 or higher. When the weight average molecular weight of the acrylic resin (A) is lower than 80000, sufficiently improved brittleness is not obtained and compatibility with the cellulose ester resin (B) may be deteriorated. The weight average molecular weight of the acrylic resin (A) is more preferably in the range of 80000 to 1000000, particularly preferably in the range of 100000 to 600000, and most preferably in the range of 150000 to 400000. According to a preferred mode, upper limit of the weight average molecular weight (Mw) of the acrylic resin (A) is, although not particularly limited, preferably 1000000 or lower from the viewpoint of production.

Meanwhile, the weight average molecular weight of the acrylic resin can be measured by means of gel permeation chromatography. The measurement condition is as follows.

Solvent: Methylene chloride
Column: Shodex K806, K805 and K803G (3 columns, manufactured by Showa Denko K.K., are used in connection)
Column temperature: 25° C.
Sample concentration: 0.1% by mass
Detector: RI Model 504 (manufactured by GL Science Corp.)
Pump: L6000 (manufactured by Hitachi Corp.)
Flow rate: 1.0 ml/min
Calibration Curve: A calibration curve based on 13 samples of standard polystyrene STK (manufactured by TOSOH CORPORATION), having a molecular weight Mw=2,800,000 to 500, is used. 13 samples are preferably used at approximately same intervals.

Method for producing the acrylic resin (A) is not specifically limited, and any one of known methods known such as a suspension polymerization, an emulsion polymerization, a block polymerization and a solution polymerization can be employed. Herein, as a polymerization initiator, a conventional peroxide or azo type initiator or a redox type initiator can be employed. With respect to polymerization temperature, the suspension or emulsion polymerization can be carried out at a temperature of from 30 to 100° C., and the block or solution polymerization can be carried out at a temperature of from 80 to 160° C. In order to control the reduction viscosity of a copolymer produced, polymerization can be conducted using a chain transfer agent such as an alkylmercaptan.

As the acrylic resin, a commercially available one may be used. Examples thereof include Delpet 60N, 80N (manufactured by Asahi Chemical Industry Co., Ltd.), Dianal BR52, BR80, BR83, BR85, BR88 (manufactured by Mitsubishi Rayon Co., Ltd.) and KT75 (manufactured by Denki Kagaku Kogyo Co., Ltd.). Two or more kinds of an acrylic resin can be used in combination.

With regard to the cellulose ester resin (B), from the viewpoint of improving brittleness or transparency when compatibilized with the acrylic resin (A) in particular, the total substitution degree (T) of acyl group is preferably 2.0 to 3.0, the substitution degree of acyl group with 3 to 7 carbon atoms is preferably 1.2 to 3.0, and the substitution degree of acyl group with 3 to 7 carbon atoms is preferably 2.0 to 3.0. In other words, the cellulose ester resin (B) is preferably a cellulose ester resin substituted with an acyl group with 3 to 7 carbon atoms, and propionyl, butyryl, or the like are preferably used in particular. Propionyl group is particularly preferably used.

When the total substitution degree of acyl group in the cellulose ester resin (B) is lower than 2.0, that is, the residual degree of hydroxy group at position 2, 3, and 6 in the cellulose ester molecule is higher than 1.0, the acrylic resin (A) and the cellulose ester resin (B) are not fully compatibilized with each other, and there may be a problem of having haze when it is used as a polarizing plate protection film. Further, even when the total substitution degree of acyl group is 2.0 or higher, if the substitution degree of acyl group with 3 to 7 carbon atoms is lower than 1.2, a sufficient compatibility may not be obtained or brittleness may be impaired. For example, even when the total substitution degree of acyl group is 2.0 or higher, if the substitution degree of acyl group with 2 carbon atoms (that is, acetyl group) is high and the substitution degree of acyl group with 3 to 7 carbon atoms is lower than 1.2, the compatibility is impaired so that the haze may increase. Further, even when the total substitution degree of acyl group is 2.0 or higher, if the substitution degree of acyl group with 8 or more carbon atoms is high and the substitution degree of acyl group with 3 to 7 carbon atoms is lower than 1.2, the brittleness is impaired so that the desired properties may not be obtained.

Regarding the acyl substitution degree of the cellulose ester resin (B), it is sufficient if the total substitution degree (T) is 2.0 to 3.0 and the substitution degree of acyl group with 3 to 7 carbon atoms is 1.2 to 3.0. However, it is preferable that sum of the substitution degree of acyl group with carbon atom number of other than 3 to 7, that is, acetyl group or acyl group with 8 or more carbon atoms, is 1.3 or lower. Further, the total substitution degree (T) of the acyl group in the cellulose ester resin (B) is more preferably in the range of 2.5 to 3.0.

Meanwhile, the acyl group may be either an aliphatic acyl group or an aromatic acyl group. In case of an aliphatic acyl group, it may be either linear or branched, and it may also have a substituent group. In the present invention, carbon atom number of the acyl group includes the substituent group of the acyl group.

When the cellulose ester resin (B) has an aromatic acyl group as a substituent group, number of the substituent group X substituted on the aromatic ring is preferably 0 to 5. Even in such case, a caution needs to be made such that the substitution degree of acyl group with 3 to 7 carbon atoms including a substituent group is 1.2 to 3.0. For example, because a benzoyl group has a carbon atom number of 7, when it has a substituent group containing a carbon atom, the carbon atom number as a benzoyl group will be 8 or higher, and it is not included in the acyl group with 3 to 7 carbon atoms.

Further, when the number of the substituent group substituted on an aromatic group is 2 or higher, they may be the same or different from each other and may link to each other to form a condensed polycyclic compound (for example, naphthalene, indene, indane, phenanthrene, quinoline, isoquinoline, chromene, chromane, phthalazine, acridine, indole, and indoline).

The cellulose ester resin (B) is preferably at least one kind selected from cellulose acetate propionate, cellulose acetate butyrate, cellulose acetate benzoate, cellulose propionate, and cellulose butyrate. Among them, particularly preferred cellulose ester resin is cellulose acetate propionate and cellulose propionate.

Meanwhile, the part not substituted with an acyl group is generally present as a hydroxy group. It can be synthesized by a known method. Further, the substitution degree of acetyl group or substitution degree of other acyl group is obtained by the method defined in ASTM-D817-96.

The weight average molecular weight (Mw) of the cellulose ester resin (B) is, from the viewpoint of improving the compatibility with the acrylic resin (A) and brittleness, preferably 75000 or higher, more preferably in the range of 75000 to 300000, still more preferably in the range of 100000 to 240000, and particularly preferably 160000 to 240000. When the weight average molecular weight (Mw) of the cellulose ester resin (B) is lower than 75000, the effect of improving heat resistance or brittleness is not obtained at sufficient level. In the present invention, two or more kinds of the cellulose resin may be used as a mixture.

In the optical film of the present invention, the acrylic resin (A) and the cellulose ester resin (B) are contained at mass ratio of 95:5 to 30:70 and also in a compatibilized state. Preferably, it is 95:5 to 50:50, and more preferably 90:10 to 60:40. When the mass ratio between the acrylic resin (A) and the cellulose ester resin (B) is higher than 95:5 to have higher acrylic resin (A), the effect of the cellulose ester resin (B) may not be obtained at sufficient level. When the mass ratio between the acrylic resin (A) and the cellulose ester resin (B) is lower than 30:70 to have lower acrylic resin, the moisture resistance may become insufficient.

In the aforementioned optical film, it is necessary that the acrylic resin (A) and the cellulose ester resin (B) are contained in a compatibilized state, because the physical properties or qualities that are required for an optical film need to be achieved by mutual supplementation based on compatibilization of different resins. Meanwhile, the compatibilized state of the acrylic resin (A) and the cellulose ester resin (B) can be determined in view of glass transition temperature Tg, for example. When the glass transition temperature is different for two resins, for example, the mixture obtained by mixing two resins has two or more glass transition temperatures as there is a glass transition temperature for each resin. However, when the two resins are compatibilized with each other, intrinsic glass transition temperature of each resin is lost to yield one glass transition temperature, which corresponds to the glass transition temperature of the compatibilized resins. Meanwhile, the glass transition temperature described herein refers to a midpoint glass transition temperature (Tmg), which is measured by using a scanning differential calorimeter (Type DSC-7, produced by Perkin Elmer Co.) at a temperature increasing rate of 20° C./min in accordance with JIS K7121 (1987).

Further, the expression "containing the acrylic resin (A) or the cellulose ester resin (B) in a compatibilized state" indicates that, by mixing each resin (polymer) as described above, a compatibilized state is obtained as a result, and it does not include a state in which a mixture resin is present as a result of mixing an acrylic resin precursor such as a monomer, a dimer, or an oligomer with the cellulose ester resin (B) followed by polymerization.

For example, the process for obtaining a mixture resin by mixing an acrylic resin precursor such as a monomer, a dimer, or an oligomer with the cellulose ester resin (B) followed by polymerization includes a complicated polymerization reaction and, with regard to the resin produced by the method, it is difficult to control the reaction and also it is difficult to adjust the molecular weight. Further, when a resin is synthesized according to that method, graft polymerization, a cross-linking reaction, or a cyclization reaction often occurs, and there are many cases in which it is not dissolved in a solvent or cannot be melt by heating, and thus it is difficult to measure the weight average molecular weight (Mw) by eluting an acrylic resin from the mixture resin. As such, it is difficult to control the physical properties so that it cannot be used as a resin for stable synthesis of an optical film.

Each of the acrylic resin (A) and the cellulose ester resin (B) is preferably a non-crystalline resin, and any one of them can be a crystalline polymer or a polymer partially having crystallinity. In the present invention, it is preferable that, according to compatibilization of the acrylic resin (A) and the cellulose ester resin (B), a non-crystalline resin is yielded.

In the optical film of the present invention, the weight average molecular weight (Mw) of the acrylic resin (A) or the weight average molecular weight (Mw) or substitution degree of the cellulose ester resin (B) is obtained by measurement of each after fractionating using a difference in solubility of two resins in a solvent. For fractionating the resin, it is possible to fractionate a soluble resin by extraction according to addition of a compatibilized resin to a solvent for dissolving just one of them. At that time, a heating operation or reflux can be performed. It is also possible to fractionate the resin by combining the solvent combination for two or more processes. The solubilized resin and the resin remained as insolubles are separated by filtration, and by a process of evaporating and drying the solvent from the solution containing an extract, the resins can be fractionated. The fractionated resins can be characterized by general structural analysis of polymer. Even for a case in which the aforementioned optical film contains a resin other than the acrylic resin (A) or the cellulose ester resin (B), the fractionation can be made in the same manner as above.

Further, when the compatibilized resins have a different weight average molecular weight (Mw), not only the fractionation can be easily made but also the molecular weight can be measured since the high molecular weight matter is eluted early while the low molecular weight matter is eluted over a long period of time according to gel permeation chromatography (GPC).

Further, by simultaneously performing a quantitative structure analysis of the resin obtained by removing the solvent by distillation and drying after fractionating an eluted resin solution at each time point with measuring the molecular weight of the compatibilized resin by GPC, each compatibilized resin can be characterized by detecting the resin composition of each fractionation with different molecular weight. It is also possible to detect each compatibilized resin by measuring molecular weight distribution by GPC of each resin, which has been previously fractionated based on a difference in solubility in a solvent.

Meanwhile, the aforementioned optical film may be achieved by containing a resin other than the acrylic resin (A) or the cellulose ester resin (B) or an additive, as long as it does not inhibit the function of a polarizing plate protection film. When a resin other than the acrylic resin (A) or the cellulose ester resin (B) is contained, the resin to be added may be in a compatibilized state or just mixed without being solubilized. Further, the total mass of the acrylic resin (A) and the cellulose ester resin (B) in the aforementioned optical film is preferably 55% by mass or more, more preferably 60% by mass or more, and particularly preferably 70% by mass or more.

In the above, a polarizing plate protection film consisting of blend form of an acrylic resin and a cellulose ester resin is explained as a preferred embodiment. However, in the IPS liquid crystal display device according to this aspect, the first, the third, and the fourth polarizing plate protection film are preferably a so-called "zero phase difference film." By having a zero phase difference film as a polarizing plate protection film, an advantage of inhibiting color shift (that is, a coloration phenomenon of light leaked from inclination when black display is performed) is obtained. Meanwhile, when it is expressed quantitatively, the first polarizing plate protection film, the third polarizing plate protection film, and the fourth polarizing plate protection film preferably satisfy, with regard to the Ro and Rth each represented by the following Mathematical Formula (1) and Mathematical Formula (2), $$Ro=(nx-ny)\times d[\text{nm}] \quad \text{Mathematical Formula (1)}$$

$$Rth=\{(nx+ny)/2-nz\}\times d[\text{nm}] \quad \text{Mathematical Formula (2)}$$

(in the formulae, nx represents in-plane refractive index in the slow axis direction of the film, ny represents in-plane refractive index in the fast axis direction of the film, nz represents refractive index in the thickness direction of the film, and d represents the thickness (nm) of the film; the refractive index is measured at wavelength of 590 nm under environment of 23° C. and 55% RH), the following relationship $$-5 \leq Ro \leq 5$$

$$-5 \leq Rth \leq 5.$$

Ro is more preferably −3 to 3, and particularly preferably −1 to 1. Further, Rth is more preferably −3 to 3, and particularly preferably −1 to 1. Meanwhile, for controlling the Ro and Rth to have a value in the aforementioned range, composition or stretching condition for the film, type or addition amount of a retardation controlling agent, or the like can be suitably adjusted at production of the polarizing plate protection film.

(Second Polarizing Plate Protection Film)

The second polarizing plate protection film is a film arranged at the liquid crystal cell side of the polarizing plate, which is positioned at the viewing side of the liquid crystal cell (that is, the first polarizing plate).

In the present invention, the first characteristic of the second polarizing plate protection film is that the film thickness is 30 to 60 μm. When the film thickness of the second polarizing plate protection film is less than 30 μm, shrinkage of the polarizer cannot be inhibited, and there is a possibility that the polarizing plate is shrunken more than necessary and heterogeneity is caused by heat generated at panel lighting. Meanwhile, when the film thickness of the second polarizing plate protection film is more than 60 μm, there is a possibility that a phase difference fluctuation is caused by heat generated at panel lighting and the viewing angle is changed.

Further, the second characteristic of the second polarizing plate protection film is that it has a structure obtained by laminating a first optically anisotropic layer, which contains a polymer having a positive intrinsic birefringence, and a second optically anisotropic layer, which contains a polymer having a negative intrinsic birefringence. Meanwhile, as long as the requirements of the present invention are satisfied, the second polarizing plate protection film may further have a layer other than the first and the second optically anisotropic layer. Further, any one of the first optically anisotropic layer and the second optically anisotropic layer can be arranged so as to be positioned at the viewing side (that is, polarizer side of the first polarizing plate). However, when a cellulose ester resin is contained in the first optically anisotropic layer as described later, it is preferred that these two optically anisotropic layers are arranged such that the first optically anisotropic layer is positioned at the viewing side (that is, polarizer side of the first polarizing plate), because easy application to a polarizer using an aqueous solution of polyvinyl alcohol by alkali saponification treatment of the first optically anisotropic layer can be obtained in that way. Hereinbelow, the second characteristic is explained in greater detail.

<Birefringence Test of Polymer>

As described herein, determining whether the polymer has a positive intrinsic birefringence or a negative intrinsic birefringence relative to the stretching direction can be made based on the following test.

Only the polymer is dissolved in a solvent, cast to form a film, and dried by heating to obtain a film with a transmittance of 80% or more. The resultant film is evaluated for birefringence.

Measurement of refractive index is carried out through an Abbe refractometer-4T (produced by ATAGO Co., Ltd,) employing a multi-wavelength light source. A refractive index in the stretching direction is designated as Nx, and a refractive index in the in-plane direction perpendicular to it is designated as Ny when the film is stretched in the width direction. For a film satisfying formula (Nx−Ny)>0 regarding each refractive index at 590 nm, the corresponding polymer is determined to have a positive intrinsic birefringence relative to the stretching direction. Similarly, for a case of (Nx−Ny)<0, it is determined to have a negative intrinsic birefringence.

<First Optically Anisotropic Layer (Polymer Having Positive Intrinsic Birefringence)>

The first optically anisotropic layer constituting the second polarizing plate protection film contains a polymer having a positive intrinsic birefringence. The polymer having a positive intrinsic birefringence is not particularly limited as long as it is a polymer having a property of increasing refractive index in stretching direction at stretching. However, those with high transparency and thermoplasticity are preferable. Meanwhile, if it is a mixture containing plural materials capable of expressing a positive intrinsic birefringence, it is not necessary for the component present dominantly in the first optically anisotropic layer in terms of mass fraction or volume fraction to have a positive intrinsic birefringence. Specific examples of the polymer having a positive intrinsic birefringence include a cellulose resin such as triacetyl cellulose (TAC) or cellulose acetate propionate (CAP), a polynorbornene resin, a polycarbonate resin, a polyester resin, a polyether sulfone resin, a polysulfone resin, a polyamide resin, a polyimide resin, a polyolefin resin, a polyarylate resin, a polyvinyl alcohol resin, a polyvinyl chloride resin, a polyvinylidene chloride resin, and a mixture thereof. Among them, the cellulose resin is preferable, and the cellulose ester resin is more preferable. In particular, a cellulose ester resin substituted with an acyl group having 2 to 4 carbon atoms, or an acyl group with 2 carbon atoms and an acyl group with 3 to 4 carbon atoms, in which the total substitution degree of acyl group is between 1.0 and 2.4 and the total carbon atom number of the acyl substituent group is 4.4 or more, can be employed as a preferred mode of the polymer having a positive intrinsic birefringence.

Meanwhile, when the polymer having a positive intrinsic birefringence contains a cellulose ester resin, weight average molecular weight (Mw) of the cellulose ester resin is, from the viewpoint of the film strength (brittleness and mechanical strength), preferably 75000 or more, more preferably in the range of 75000 to 300000, still more preferably in the range of 100000 to 240000, and particularly preferably 160000 to 240000.

Further, when the polymer having a positive intrinsic birefringence contains a cellulose ester resin, the first optically anisotropic layer preferably contains, as an additive, an acrylic polymer having weight average molecular weight (Mw) of 500 to 30000. By having this constitution, the adhesiveness to the second optically anisotropic layer can be improved. Among them, it is preferable to contain the polymer $X_1$ having weight average molecular weight 500 to 30000, which is obtained by polymerizing ethylenically unsaturated monomer Xa not containing an aromatic ring and a hydrophilic group in the molecule or the polymer $X_2$ having weight average molecular weight 500 to 30000, which is obtained by copolymerizing ethylenically unsaturated monomer Xa not containing an aromatic ring and a hydrophilic group in the molecule and ethylenically unsaturated monomer Xb not containing an aromatic ring but containing a hydrophilic group in the molecule. As described herein, examples of the ethylenically unsaturated monomer Xa not containing an aromatic ring and a hydrophilic group in the molecule include (meth)acrylic acid ester, described later. Among them, methyl methacrylate (MMA) is particularly preferable. Further, examples of the ethylenically unsaturated monomer Xb not containing an aromatic ring but containing a hydrophilic group in the molecule include acryloyl morpholine, vinyl pyrrolidone, 2-hydroxyethyl methacrylate, and 2-hydroxyethyl acrylate. The content ratio between the constitutional unit derived from Xa and the constitutional unit derived from Xb in $X_2$ is, although not particularly limited, preferably 50:50 to 95:5, more preferably 60:40 to 90:10, and particularly preferably 70:30 to 80:20 in terms of the molar ratio of the constitutional unit derived from Xa:the constitutional unit derived from Xb.

Meanwhile, weight average molecular weight of the aforementioned acrylic polymer is preferably 1500 to 20000, more preferably 2000 to 10000, and particularly preferably 2500 to 5000. When the weight average molecular weight of the acrylic polymer is a value within the range, an advantage of having good compatibility with the cellulose ester is obtained.

Further, content of the aforementioned acrylic polymer is, compared to total 100% by mass with the polymer having a positive intrinsic birefringence, preferably 10 to 40% by mass, and more preferably 20 to 30% by mass.

Film thickness of the first optically anisotropic layer is not particularly limited if it allows that the film thickness of the second polarizing plate protection film is a value within the range of 30 to 60 μm. However, it is preferably 10 to 40 μm, and more preferably 15 to 30 μm.

<Second Optically Anisotropic Layer (Polymer with a Negative Intrinsic Birefringence)>

The second optically anisotropic layer constituting the second polarizing plate protection film contains a polymer having a negative intrinsic birefringence. The polymer having a negative intrinsic birefringence is not particularly limited as long as it is a polymer having a property of increasing refractive index in the direction perpendicular to the stretching direction at stretching. Exhibiting a negative intrinsic birefringence as a result of containing plural materials is the same as described above regarding the polymer having a positive intrinsic birefringence. Particularly preferred are those having high transparency and thermoplasticity. More preferably, the polymer having a negative intrinsic birefringence has a constitutional unit derived from a vinyl compound and a constitutional unit derived from an aromatic maleimide.

Herein, examples of the vinyl compound include (meth) acrylic acid ester, an aromatic vinyl compound, acrylic acid ester, and vinyl acetate. Among them, it is preferable to use (meth)acrylic acid ester and/or an aromatic vinyl compound as the vinyl compound. It is particularly preferable to use a (meth)acrylic acid ester and an aromatic vinyl compound.

The constitutional unit derived from a (meth)acrylic acid ester is a constitutional unit represented by the following formula (1). $R^1$ in the formula (1) is hydrogen atom or methyl group, and $R^2$ is a linear or cyclic alkyl group with 1 to 18 carbon atoms. It is also possible that part of the alkyl group is substituted with a hydroxyl group or an aromatic group. In addition to an aryl group (a substituent group may be included therein), a heterocyclic aromatic group is also included in the aromatic group.

(1)

Examples of the (meth)acrylic acid ester which may constitute the constitutional unit of the formula (1) include methyl (meth)acrylate, ethyl (meth)acrylate, n-butyl (meth) acrylate, i-butyl (meth)acrylate, t-butyl (meth)acrylate, cyclohexyl (meth)acrylate, benzyl (meth)acrylate, and carbazoylethyl (meth)acrylate. Among them, from the viewpoint of obtaining an optical anisotropic layer having high transparency and excellent mechanical property, methyl methacrylate (MMA) is preferable. Because MMA has a weak activity of giving a negative intrinsic birefringence to a polymer, when the (meth)acrylic acid ester is MMA, the intrinsic birefringence of the polymer has a negative increment so that the freedom related to optical design of the second optically anisotropic layer is further increased.

The constitutional unit derived from an aromatic vinyl compound has an activity of causing a negative increment in the intrinsic birefringence of the polymer. For such reasons, as the polymer has a constitutional unit derived from an aromatic vinyl compound as a constitutional unit, a polarizing plate protection film exhibiting high phase difference can be achieved so that the freedom related to optical design is increased.

The constitutional unit derived from an aromatic vinyl compound is a constitutional unit represented by the following formula (2). $R^3$ in the formula (2) is an aromatic group. $R^4$ is a hydrogen atom and $R^5$ and $R^6$ are each hydrogen atom or methyl group.

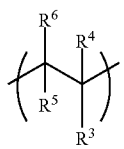

(2)

When $R^3$ is an aromatic group, $R^3$ may be a heterocyclic aromatic group as well as an aryl group (a substituent group may be included therein).

Examples of the aromatic vinyl compound include styrene, α-methylstyrene, methoxystyrene, vinyl toluene, and halogenated styrene. Among them, from the viewpoint of obtaining a polarizing plate protection film exhibiting high transparency and high phase difference, styrene is preferable.

The constitutional unit derived from an aromatic vinyl compound may be a heterocyclic aromatic vinyl compound unit as illustrated in the above formula (2), and it may be a constitutional unit formed by polymerization of vinylcarbazole, vinylpyridine, vinylimidazole, or vinylthiophene, for example.

The constitutional unit derived from an aromatic maleimide has an activity of causing a negative increment in the intrinsic birefringence of the polymer, although it is not as high as the constitutional unit derived from an aromatic vinyl compound. For such reasons, as the polymer has a constitutional unit derived from an aromatic maleimide, a polarizing plate protection film exhibiting high phase difference can be achieved so that the freedom related to optical design is increased.

Further, constitutional unit derived from an aromatic maleimide has an activity of enhancing the heat resistance of a polarizing plate protection film by compensating a decrease in Tg of the polymer, which is caused by the constitutional unit derived from an aromatic vinyl compound.

The aromatic maleimide unit is a constitutional unit represented by the following formula (3). Ar group in the formula (3) is an aryl group which may have a substituent group.

[Chem. 3]

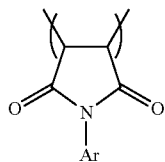

(3)

Examples of the aromatic maleimide include N-phenylmaleimide, N-chlorophenylmaleimide, N-methylphenylmaleimide, N-naphthylmaleimide, N-hydroxyphenylmaleimide, N-methoxyphenylmaleimide, N-carboxyphenylmaleimide, N-nitrophenylmaleimide, and N-tribromophenylmaleimide. Among them, from the viewpoint of obtaining a polarizing plate protection film exhibiting high Tg and high phase difference, N-phenylmaleimide is preferable.

As described above, the polymer having a negative intrinsic birefringence, which is contained in the second optically anisotropic layer, preferably has a constitutional unit derived from a vinyl compound and a constitutional unit derived from an aromatic maleimide. According to this embodiment, the content ratio of those constitutional units in the polymer having a negative intrinsic birefringence is, although not particularly limited, preferably 80:20 to 95:5, and more preferably 88:12 to 92:8 in terms of the constitutional unit derived from a vinyl compound:the constitutional unit derived from an aromatic maleimide. By having this constitution, yellowness of the film can be lowered. Further, also as described above, a (meth)acrylic acid ester and an aromatic vinyl compound are particularly preferably used as a vinyl compound. According to this embodiment, content ratio of the constitutional unit in the polymer having a negative intrinsic birefringence (that is, constitutional units each derived from a (meth)acrylic acid ester, an aromatic vinyl compound, or an aromatic maleimide) is not particularly limited. However, according to one preferred embodiment, the mass ratio of the constitutional unit derived from a (meth)acrylic acid ester is preferably 45 to 85% by mass, and more preferably 55 to 82% by mass in the polymer having a negative intrinsic birefringence. Further, the mass ratio of the constitutional unit derived from an aromatic vinyl compound is preferably 10 to 40% by mass, and more preferably 15 to 35% by mass in the polymer having a negative intrinsic birefringence. Further, the mass ratio of the constitutional unit derived from an aromatic maleimide is preferably 5 to 20% by mass, and more preferably 8 to 12% by mass in the polymer having a negative intrinsic birefringence.

Meanwhile, as long as having a negative intrinsic birefringence, the polymer having a negative intrinsic birefringence may contain a constitutional unit other than the constitutional unit derived from a (meth)acrylic acid ester, the constitutional unit derived from an aromatic vinyl compound, and the constitutional unit derived from an aromatic maleimide. Content ratio of that unit is less than 5% by mass, for example. The content ratio of the constitutional unit in the polymer can be obtained by a known method, for example, $^1$H nuclear magnetic resonance ($^1$H-NMR) or infrared spectroscopy (IR).

Weight average molecular weight (Mw) of the polymer having a negative intrinsic birefringence is preferably 100000 to 300000. When the weight average molecular weight is 100000 or higher, flexibility of the second optically anisotropic layer is ensured at sufficient level. Meanwhile, when the weight average molecular weight is 300000 or lower, the fluidity can be obtained at film molding and it is easy to form the second optically anisotropic layer. Meanwhile, weight average molecular weight (Mw) of the polymer having a negative intrinsic birefringence is more preferably 140000 to 200000.

A production method of the aforementioned polymer having a negative intrinsic birefringence is not specifically limited, and production can be achieved by a conventionally known method. For example, by polymerizing a monomer component including the aforementioned (meth)acrylic acid ester, an aromatic vinyl compound, and an aromatic maleimide, the polymer having a negative intrinsic birefringence can be produced. For polymerization of the monomer component, various known polymerization methods such as a suspension polymerization, an emulsion polymerization, or a solution polymerization can be employed. Among them, from the viewpoint of reducing a residual amount of the aromatic maleimide in the obtained polymer, the solution polymerization is preferable. The solution polymerization can be performed according to a known method. As for a polymerization solvent used for the solution polymerization, a common polymerization solvent such as toluene, xylene, ethylbenzene, isopropylbenzene, methyl isobutyl ketone, butyl cellosolve, dimethyl formaldehyde, 2-methylpyrrolidone, or methyl ethyl ketone can be suitably selected and used.

Film thickness of the second optically anisotropic layer is not particularly limited if it allows that the film thickness of the second polarizing plate protection film is a value within the range of 30 to 60 µm. However, it is preferably 10 to 40 µm, and more preferably 18 to 30 µm.

Hereinabove, explanation are given with regard to a preferred constitution of the second polarizing plate protection film, in which the second polarizing plate protection film is arranged at the liquid crystal cell side of the polarizing plate which is positioned at the viewing side of an IPS liquid crystal display device (the first polarizing plate). Thus, in order to exhibit an activity of widening a viewing angle, it is preferable that the in-plane retardation is relatively large while the retardation in the thickness direction is small. When expressed quantitatively, it is preferred that the second polarizing plate protection film satisfies, with regard to Ro and Rth represented by the following Mathematical Formula (1) and Mathematical Formula (2):

$$Ro=(nx-ny)\times d [nm] \quad \text{Mathematical Formula (1)}$$

$$Rth=\{(nx+ny)/2-nz\}\times d [nm] \quad \text{Mathematical Formula (2)}$$

(in the formulae, nx represents in-plane refractive index in the slow axis direction of the film, ny represents in-plane refractive index in the fast axis direction of the film, nz represents refractive index in the thickness direction of the film, and d represents the thickness (nm) of the film; the refractive index is measured at wavelength of 590 nm under environment of 23° C. and 55% RH)

the following relationship $$100 \leq Ro \leq 140$$

$$-40 \leq Rth \leq 0.$$

Ro is more preferably 110 to 140, and particularly preferably 115 to 135. Further, Rth is more preferably −30 to 0, and particularly preferably −30 to −10. Meanwhile, for controlling the Ro and Rth to have a value in the aforementioned range, composition or stretching condition for the film, type or addition amount of a retardation controlling agent, or the like can be suitably adjusted at production of the second polarizing plate protection film.

<Method for Producing Second Polarizing Plate Protection Film>

A method for producing the second polarizing plate protection film is not particularly limited, and conventionally known knowledge can be suitably referenced. As an exemplary method for producing the second polarizing plate protection film, a polymer having a positive intrinsic birefringence is subjected to film forming stretching by melt casting or solution casting to obtain a substrate layer. Subsequently, a polymer having a negative intrinsic birefringence is laminated on a substrate layer to obtain a laminate. After that, the obtained laminate is stretched in a direction (that is, second stretching direction) perpendicular to the stretching direction of a substrate layer (that is, first stretching direction). Accordingly, the second polarizing plate protection film can be produced. Hereinbelow, the production method is described in detail, but in the present invention, the second polarizing plate protection film can be also anyone produced by another method.

The substrate layer (a layer containing the polymer having a positive intrinsic birefringence with no stretching treatment) is produced by melt casting or solution casting. From the viewpoint of easy control of a phase difference value, it is preferably produced by melt casting. The substrate layer is produced as, considering that a layer containing the polymer having a negative intrinsic birefringence is provided or a stretching operation is performed thereon after that, a film having suitable film thickness and birefringence anisotropy. As a means for adjusting the birefringence anisotropy, a well known means is used.

Providing a layer containing the polymer having a negative intrinsic birefringence on a substrate layer can be performed by successive extrusion or coating. In particular, successive extrusion based on melt extrusion is preferably used.

With regard to the stretching, there is no limitation as long as the stretching direction before providing the polymer having a negative intrinsic birefringence (that is, first stretching direction) is perpendicular to the stretching direction after providing the polymer having a negative intrinsic birefringence (that is, second stretching direction). Meanwhile, as described herein, the expression "in direction perpendicular to" means that, when an angle is expressed in 0 to 90 degrees, the angle compared to the direction as a reference is 87 to 90 degrees. Preferably, it is 89 to 90 degrees, and more preferably 89.5 to 90 degrees.

Further, as described herein, the expression "stretching direction" defines the final direction of stretching compared to a state before stretching, and it can be achieved by a combination of multi-step stretchings. In particular, undergoing multi-steps with different stretching ratio, rate, and temperature condition is preferable as a means for having homogeneous slow axis direction (orientation angle) of a film. For example, for producing a long film, it is possible that, after forming a film of a substrate layer and longitudinal stretching in conveying direction (that is, MD direction), horizontal stretching is performed in a direction perpendicular to the conveying direction (that is, TD direction) by using a tenter. It is acceptable to have multi-step stretchings in the same direction. However, it is necessary that the stretching ratio in a certain direction is high and the slow axis of the film is in a conveying direction or in a direction perpendicular to the conveying direction. In the former case, horizontal stretching is mainly performed as the second stretching. In the latter case, longitudinal stretching is mainly performed as the second stretching. Similar to the first stretching, the second stretching can be also a combination of plural stretching operations. The first stretching direction and the second stretching direction are suitably selected so as to obtain a desired phase difference film.

With regard to a method for longitudinal stretching, stretching can be performed by using a so-called longitudinal stretching device consisting of a roll combination. Width shrinkage in longitudinal stretching can be controlled by a phase difference value and film width as desired and the shrinkage degree can be controlled by suitable selection and modification of film tension, treatment temperature, and film-roll width ratio. Absolute value of the phase difference value in thickness direction can be lowered by shrinking, but it will decrease the film width. The horizontal stretching can be also performed by using a known pin tenter, a clip tenter, or the like.

According to a preferred embodiment, the second polarizing plate protection film is produced as a long film shape by performing longitudinal stretching in conveying direction (MD direction) after forming a film of substrate layer followed by performing horizontal stretching in a direction perpendicular to the conveying direction (TD direction) by using a tenter. At that time, as a preferred condition for stretching both in MD direction and TD direction, the stretching temperature is preferably 120 to 160° C., and more preferably 130 to 150° C. Further, the stretching ratio is preferably 10 to 50%, more preferably 20 to 40%, and even more preferably 25 to 35%.

According to the aforementioned production method, stretching is conducted twice in total for the substrate layer containing polymer having a positive intrinsic birefringence. Meanwhile, for the layer containing the polymer having a negative intrinsic birefringence, there is only the second stretching after forming laminate. Herein, the second stretching ratio is determined in consideration of a phase difference that is required for a layer containing the polymer having a negative intrinsic birefringence. Thus, if there is no first stretching, the phase difference of a substrate layer is simply determined by the phase difference of the layer containing the polymer having a negative intrinsic birefringence. However, according to the aforementioned production method, as there is a step for performing in advance the first stretching of a substrate layer, only the phase difference of a substrate layer can be controlled, and therefore the phase difference of a substrate layer (the first optically anisotropic layer) and the phase difference of the layer containing the polymer having a negative intrinsic birefringence (the second optically anisotropic layer) can be independently controlled. As a result, a laminate in which each layer has any phase difference can be integrally molded according to the method described above.

For example, regarding the second polarizing plate protection film having a constitution of laminated first optically anisotropic layer and second optically anisotropic layer obtained as described above, if the second polarizing plate protection film exhibits a desired phase difference as a whole, retardation of each optical anisotropic layer is not particularly limited. However, as a preferred example of the retardation of each optical anisotropic layer, it is preferred that the first optically anisotropic layer (a layer containing the polymer having a positive intrinsic birefringence and obtained by stretching the substrate layer) satisfies, with regard to Ro and Rth each represented by the following Mathematical Formula (1) and Mathematical Formula (2):

$$Ro=(nx-ny) \times d \text{[nm]} \qquad \text{Mathematical Formula (1)}$$

$$Rth=\{(nx+ny)/2-nz\} \times d \text{[nm]} \qquad \text{Mathematical Formula (2)}$$

(in the formulae, nx represents in-plane refractive index in the slow axis direction of the film, ny represents in-plane refractive index in the fast axis direction of the film, nz represents refractive index in the thickness direction of the film, and d represents the thickness (nm) of the film; the refractive index is measured at wavelength of 590 nm under environment of 23° C. and 55% RH), the following relationship $$-10 \leq Ro \leq 10$$

$$80 \leq Rth \leq 120$$

By having such constitution, recognizability of the display device can be improved. Ro is more preferably −5 to 5 and particularly preferably 0 to 5. Further, Rth is more preferably 80 to 110 and particularly preferably 80 to 100. Meanwhile, for controlling Ro and Rth to a value within the aforementioned range, composition of a dope for constituting the substrate layer or conditions for the first and the second stretching can be suitably controlled at production of the second polarizing plate protection film.

Further, it is preferred that the second optically anisotropic layer (a layer containing the polymer having a negative intrinsic birefringence and obtained by stretching after being formed on a substrate layer) satisfies, with regard to Ro and Rth each represented by the Mathematical Formula (1) and Mathematical Formula (2):

the following relationship $$100 \leq Ro \leq 160$$

$$140 \leq Rth \leq -80. \qquad \text{[Mathematical Formula 13]}$$

By having such constitution, recognizability of the display device can be improved. Ro is more preferably 100 to 140 and particularly preferably 100 to 120. Further, Rth is more preferably −140 to −100 and particularly preferably −120 to −100. Meanwhile, for controlling Ro and Rth to a value within the aforementioned range, composition of a dope for constituting a layer containing the polymer having a negative intrinsic birefringence, which is formed on a substrate layer, or conditions for the second stretching can be suitably controlled at production of the second polarizing plate protection film.

Meanwhile, if it is desired to further increase the adhesiveness between the substrate layer (the first optically anisotropic layer) and the layer containing the polymer having a negative intrinsic birefringence (the second optically anisotropic layer), an easy adhesion layer may be formed between the two layers. Materials for the easy adhesion layer are not particularly limited, and known materials can be suitably used. Film thickness of the easy adhesion layer is preferably 1 μm or less, and more preferably 0.5 μm or less.

(Additives)

It has been described above that the second polarizing plate protection film preferably contains an acrylic polymer as an additive. However, each of the first to the fourth polarizing plate protection film may also contain other additives. Examples of other additives include a plasticizer, an UV absorbing agent, an infrared absorbing agent, a mattifying agent, and a coloring agent.

<Plasticizer>

The polarizing plate protection film may contain plasticizer. Specific types of the plasticizer are not particularly limited, but examples thereof include a polyester-based plasticizer and a sugar ester compound.

<Polyester-Based Plasticizer>

Specific structure of the polyester-based plasticizer is not particularly limited, and a polyester-based plasticizer having an aromatic ring or a cycloalkyl ring in the molecule can be used. Examples of the polyester-based plasticizer include

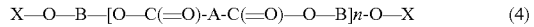

a polyester compound represented by the above formula (4).

In the formula (4), B represents a linear or branched alkylene group or cycloalkylene group with 2 to 6 carbon atoms, A represents an aromatic ring with 6 to 14 carbon atoms or a linear or branched alkylene group or cycloalkylene group with 2 to 6 carbon atoms, X represents a hydrogen atom or a monocarboxylic acid residue containing an aromatic ring with 6 to 14 carbon atoms, and n represents a natural number of 1 or more.

The polyester-based plasticizer represented by the formula (4) is an alternating copolymer obtained by alternating copolymerization of dicarboxylic acid having an aromatic ring (6 to 14 carbon atoms) or a linear or branched alkylene group or cycloalkylene group (both with 2 to 6 carbon atoms) and linear or branched alkylene diol or cycloalkylene diol with 2 to 6 carbon atoms. Each of the aromatic dicarboxylic acid and dicarboxylic acid having a linear or branched alkylene group or cycloalkylene group may be used either singly or as a mixture. However, from the viewpoint of the compatibility with a resin as a main component of the polarizing plate protection film (for example, a cellulose ester resin), it is preferable that the aromatic dicarboxylic acid is contained at 10% or more. Further, two ends may be blocked with monocarboxylic acid having an aromatic ring (6 to 14 carbon atoms).

Examples of the dicarboxylic acid having an aromatic ring (6 to 14 carbon atoms), that is, aromatic dicarboxylic acid with 6 to 16 carbon atoms, include phthalic acid, isophthalic acid, terephthalic acid, 1,5-naphthalene dicarboxylic acid, 1,4-naphthalene dicarboxylic acid, 1,8-naphthalene dicarboxylic acid, 2,3-naphthalene dicarboxylic acid, 2,6-naphthalene dicarboxylic acid, 2,8-naphthalene dicarboxylic acid, 2,2'-biphenyl dicarboxylic acid, and 4,4'-biphenyl dicarboxylic acid. Among them, preferred are terephthalic acid, 2,6-naphthalene dicarboxylic acid, and 4,4'-biphenyl dicarboxylic acid.

Examples of the dicarboxylic acid having a linear or branched alkylene group or cycloalkylene group (2 to 6 carbon atoms) include malonic acid, succinic acid, glutaric acid, adipic acid, pimeric acid, suberic acid, 1,2-cyclohexane dicarboxylic acid, and 1,4-cyclohexane dicarboxylic acid. Among them, preferred are succinic acid, adipic acid, and 1,4-cyclohexane dicarboxylic acid.

Examples of the linear or branched alkylene diol or cycloalkylene diol with 2 to 6 carbon atoms include ethane diol (ethylene glycol), 1,2-propane diol, 1,3-propane diol, 1,2-butane diol, 1,3-butane diol, 2-methyl-1,3-propane diol, 1,4-butane diol, 1,5-pentane diol, 3-methyl-, 5-pentane diol, 1,6-hexane diol, 1,4-cyclohexane diol, and 1,4-cyclohexane dimethanol. Among them, preferred are ethane diol (ethylene glycol), 1,2-propane diol, 1,3-propane diol, and 1,3-butane diol.

Among them, a benzene ring, a naphthalene ring, or a biphenyl ring in which A may have a substituent group are preferred in that they have an excellent property of providing plasticity. As described herein, the "substituent group" which may be contained in a benzene ring, a naphthalene ring, or a biphenyl ring means an alkyl group with 1 to 6 carbon atoms, an alkenyl group with 2 to 6 carbon atoms, or an alkoxy group with 1 to 6 carbon atoms.

Examples of the monocarboxylic acid having an aromatic group (6 to 14 carbon atoms) for blocking both ends of the polyester compound include benzoic acid, orthotoluic acid, metatoluic acid, paratoluic acid, para tertiary butyl benzoic acid, dimethyl benzoic acid, and paramethoxy benzoic acid. Among them, preferred are benzoic acid, paratoluic acid, and para tertiary butyl benzoic acid.

The aromatic polyester compound can be easily synthesized by any one of thermal fusion condensation based on polyesterification or ester exchange between the aforementioned dicarboxylic acid and alkylene diol or cycloalkylene diol or interface condensation between chloride of the acid and glycols according to a common method. Further, by adding the aforementioned aromatic monocarboxylic acid, a polyester compound with two blocked ends can be synthesized.

Hereinbelow, the aromatic polyester compound which may be used in the present invention is exemplified.

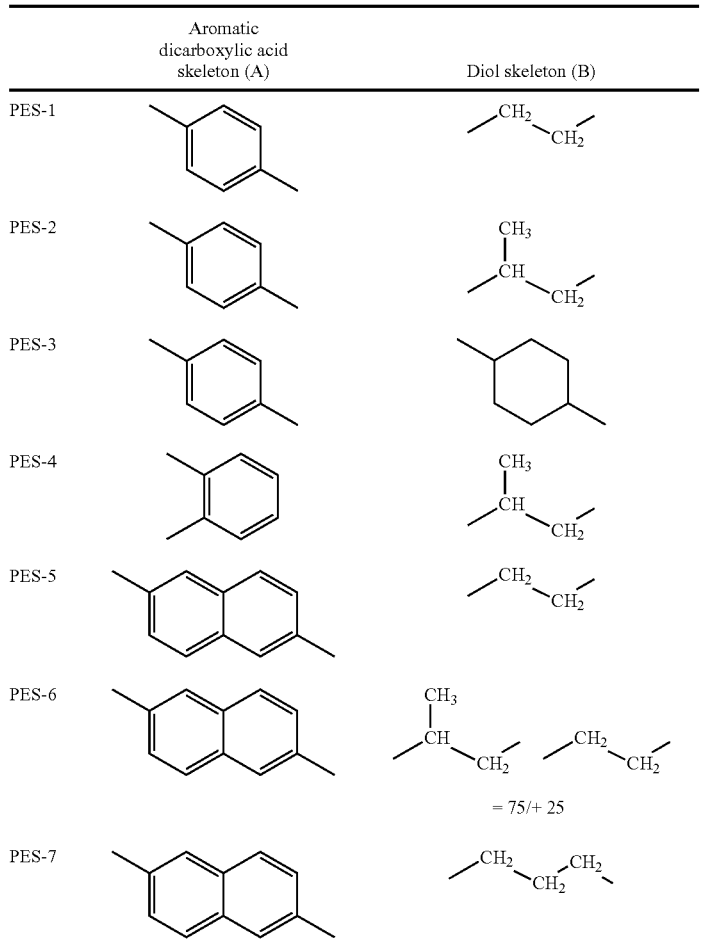

-continued
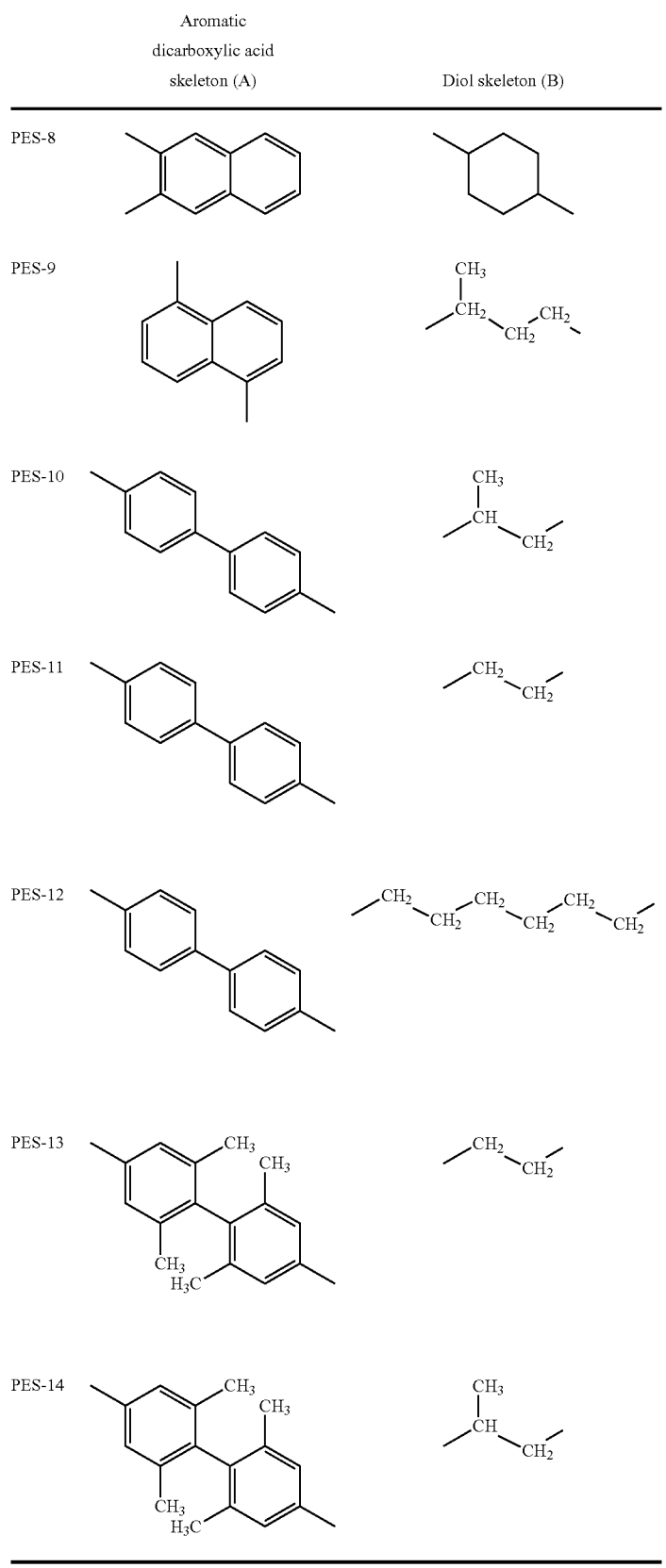

(1)
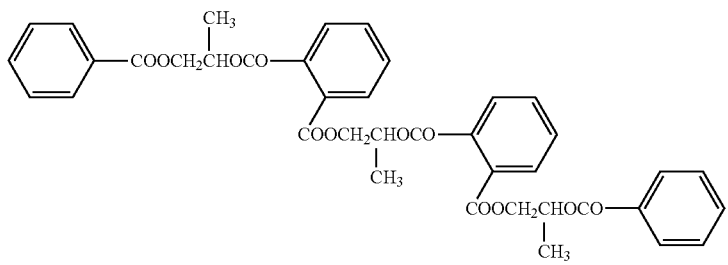
Mw: 696
(2)
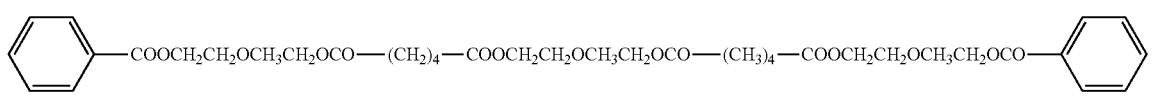
Mw: 746
(3)
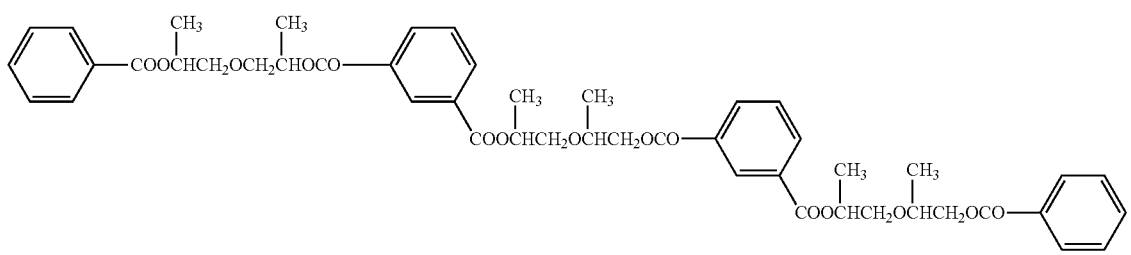
Mw: 830
(4)
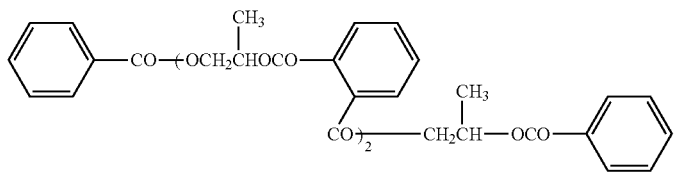
Mw: 886
(5)
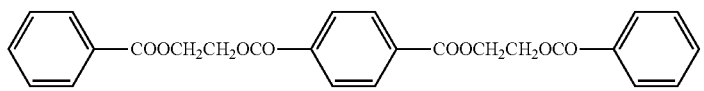
Mw: 462
(6)
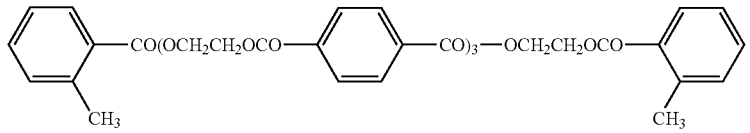
Mw: 874
(7)
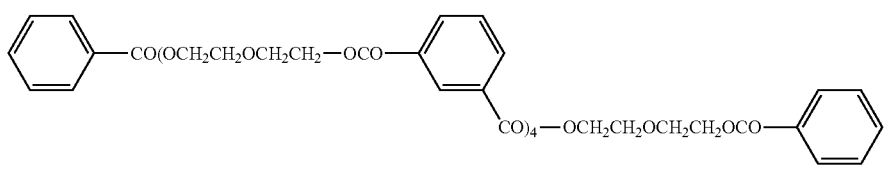
Mw: 1258
(8)
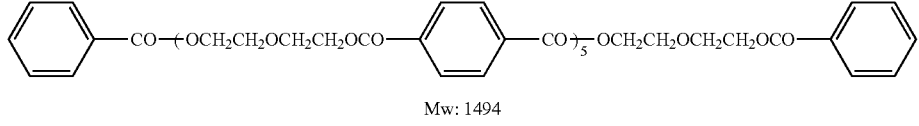
Mw: 1494

-continued
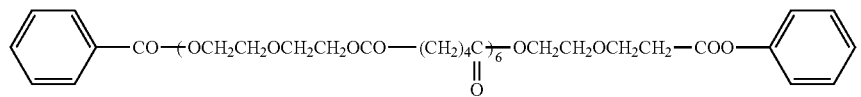
Mw: 1394
(9)
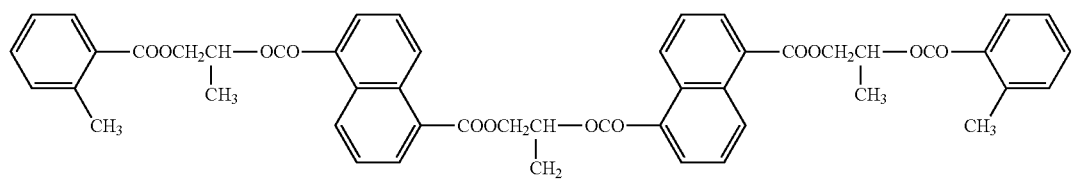
Mw: 852
(10)
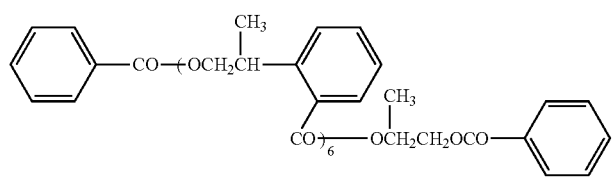
Mw: 1314
(11)
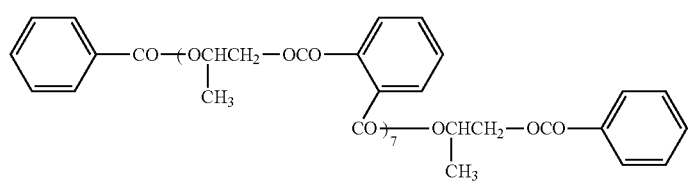
Mw: 1726
(12)
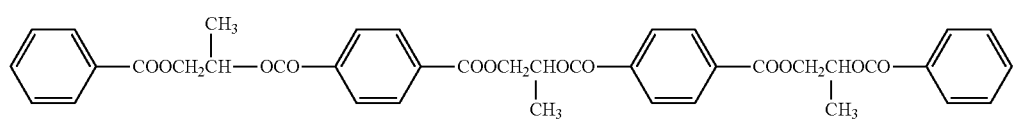
Mw: 696
(13)
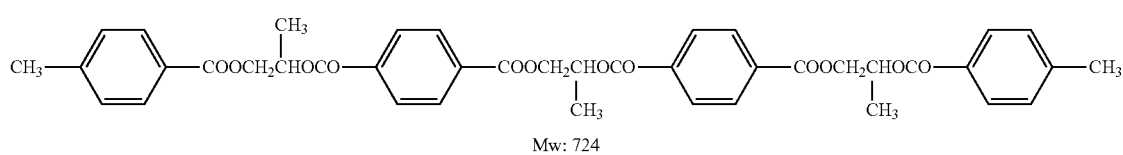
Mw: 724
(14)
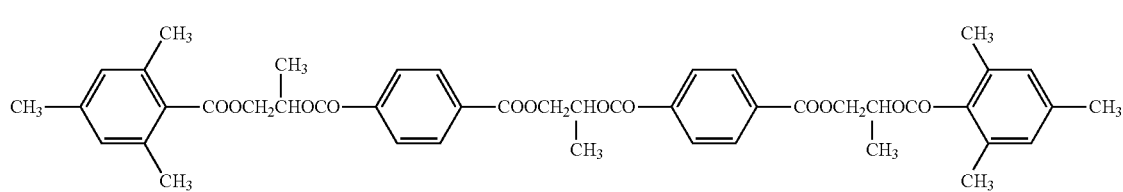
Mw: 780
(15)
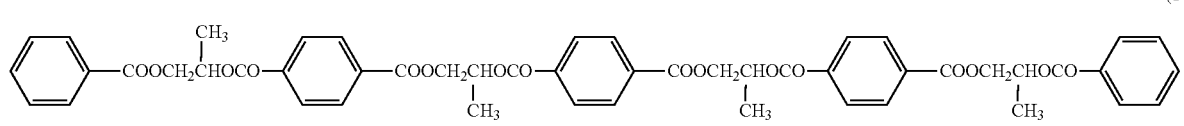
Mw: 902
(16)

-continued

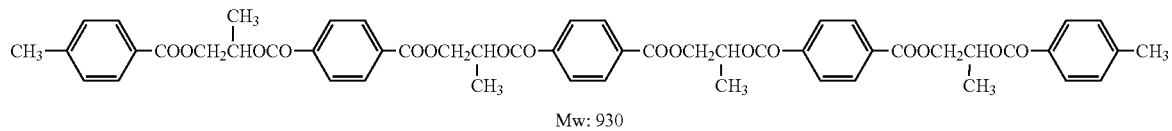
Mw: 930 (17)

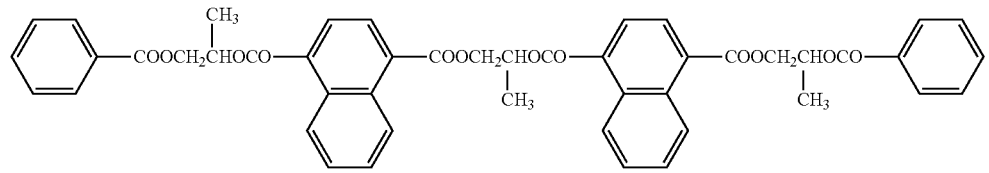
Mw: 796 (18)

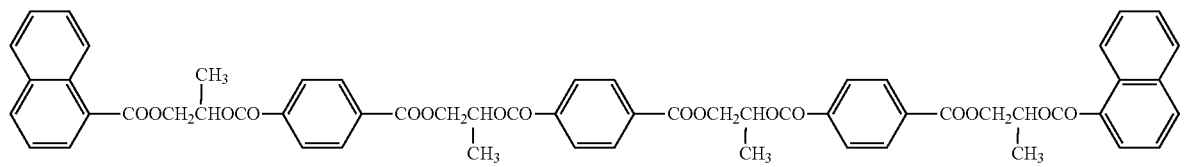
Mw: 1002 (19)

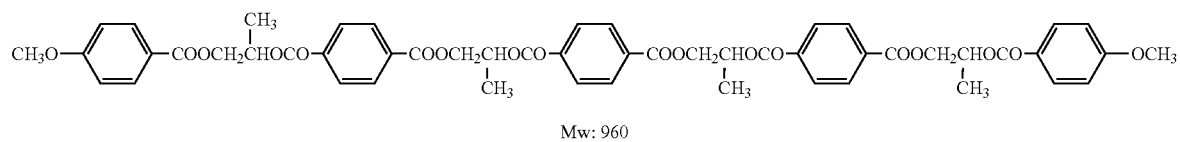
Mw: 960 (20)

The polarizing plate protection film may further contain a plasticizer other than the polyester compound represented by the formula (4).

The plasticizer other than the polyester compound represented by the formula (4) is not particularly limited, but it is preferably selected from a polyhydric carboxylic acid ester plasticizer, a glycolate plasticizer, a phthalic acid ester plasticizer, a fatty acid ester plasticizer, a polyhydric alcohol ester plasticizer, an ester plasticizer, and an acrylic plasticizer.

The polyhydric alcohol ester plasticizer is a plasticizer consisting of an ester of aliphatic polyhydric alcohol with valency of 2 or more and monocarboxylic acid. Particularly preferred is the one with aromatic ring or cycloalkyl ring in the molecule. Preferably, it is aliphatic polyhydric alcohol ester with valency of 2 to 20.

Polyhydric alcohol preferably used in the present invention is represented by the following formula (a).

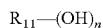  Formula (a):

(in the formula, $R_{11}$ is an organic group with valency of n, n is a positive integer of 2 or higher, and OH group represents an alcoholic and/or phenolic hydroxyl group).

Examples of preferred polyhydric alcohol include the followings, but not limited thereto.

Adonitol, arabitol, ethylene glycol, diethylene glycol, triethylene glycol, tetraethylene glycol, 1,2-propane diol, 1,3-propane diol, dipropylene glycol, tripropylene glycol, 1,2-butane diol, 1,3-butane diol, 1,4-butane diol, dibutylene glycol, 1,2,4-butanetriol, 1,5-pentane diol, 1,6-hexane diol, hexanetriol, galactitol, mannitol, 3-methylpentane-1,3,5-triol, pinacol, sorbitol, trimethylolpropane, trimethylolethane, and xylitol.

Triethylene glycol, tetraethylene glycol, dipropylene glycol, tripropylene glycol, sorbitol, trimethylolpropane, and xylitol are particularly preferable.

Monocarboxylic acid used in the polyhydric alcohol ester is not specifically limited, and well known aliphatic monocarboxylic acid, alicyclic monocarboxylic acid and aromatic monocarboxylic acid can be used. It is preferable to use alicyclic monocarboxylic acid or aromatic monocarboxylic acid from the viewpoint of improving water permeability and reservablity.

Examples of preferred monocarboxylic acid include the followings, but not limited thereto.

As aliphatic monocarboxylic acid, fatty acid having a straight chain or a side chain with 1 to 32 carbon atoms can be preferably used. The carbon atom number is more preferably 1 to 20 and particularly preferably 1 to 10. It is preferable to use acetic acid because compatibility with cellulose acetate increases, and it is also preferable to use acetic acid and other monocarboxylic acid in combination.

Examples of preferred aliphatic monocarboxylic acid include saturated fatty acid such as acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecylic acid, stearic acid, nonadecanoic acid, arachidic acid, behenic acid, lignoceric acid, cerotinic acid, heptacosanoic acid, montanic acid, melissic acid and lacceric acid; and unsaturated fatty acid such as undecylenoic acid, oleic acid, sorbic acid, linoleic acid, linolenic acid and arachidonic acid.

Examples of preferred alicyclic monocarboxylic acid include cyclopentane carboxylic acid, cyclohexanoic acid, cyclooctane carboxylic acid, and derivatives thereof.

Examples of preferred aromatic monocarboxylic acid include those in which 1 to 3 alkyl groups or alkoxy groups such as methoxy group or ethoxy group are introduced to a benzene ring of benzoic acid such as benzoic acid and toluic acid; aromatic monocarboxylic acid having at least two benzene rings such as biphenyl carboxylic acid, naphthalene carboxylic acid, or tetraline carboxylic acid; or derivatives thereof. Benzoic acid is particularly preferable.

The molecular weight of polyhydric alcohol ester is not particularly limited, but it is preferably 300 to 1,500 and more preferably 350 to 750. It is preferable to have a large molecular weight to make it difficult to evaporate and it is preferable to have a small molecular weight from the viewpoint of water permeability and compatibility with cellulose acetate.

Carboxylic acid used in polyhydric alcohol ester may be either one type or a mixture of at least two types. Further, all of OH groups in polyhydric alcohol may be esterified or a part of them may be remained as an OH group itself.

In the following, specific exemplary compounds of the polyhydric alcohol ester will be described.

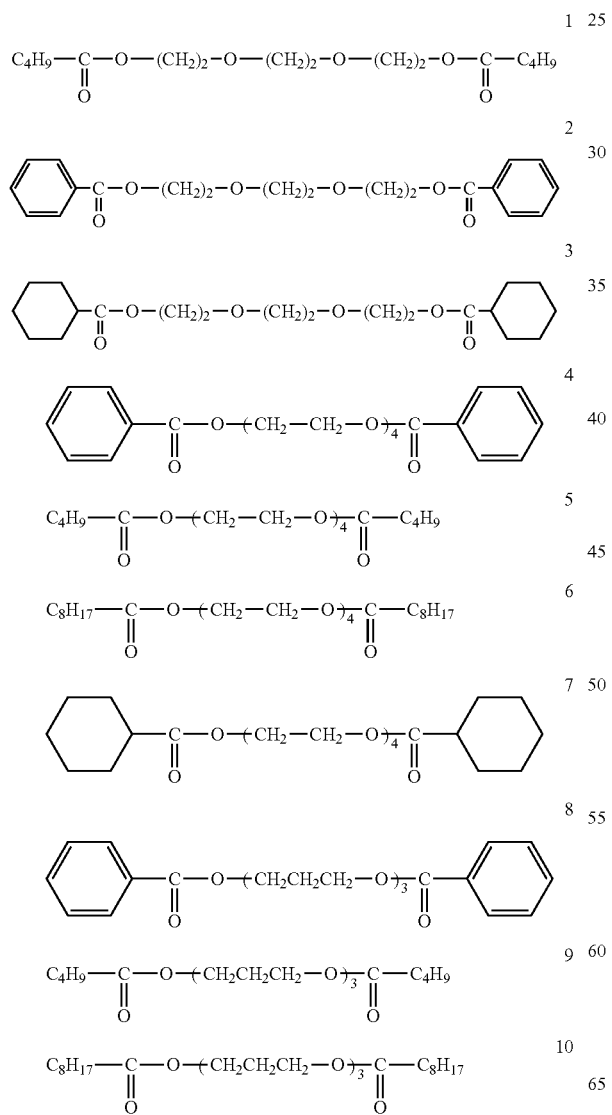

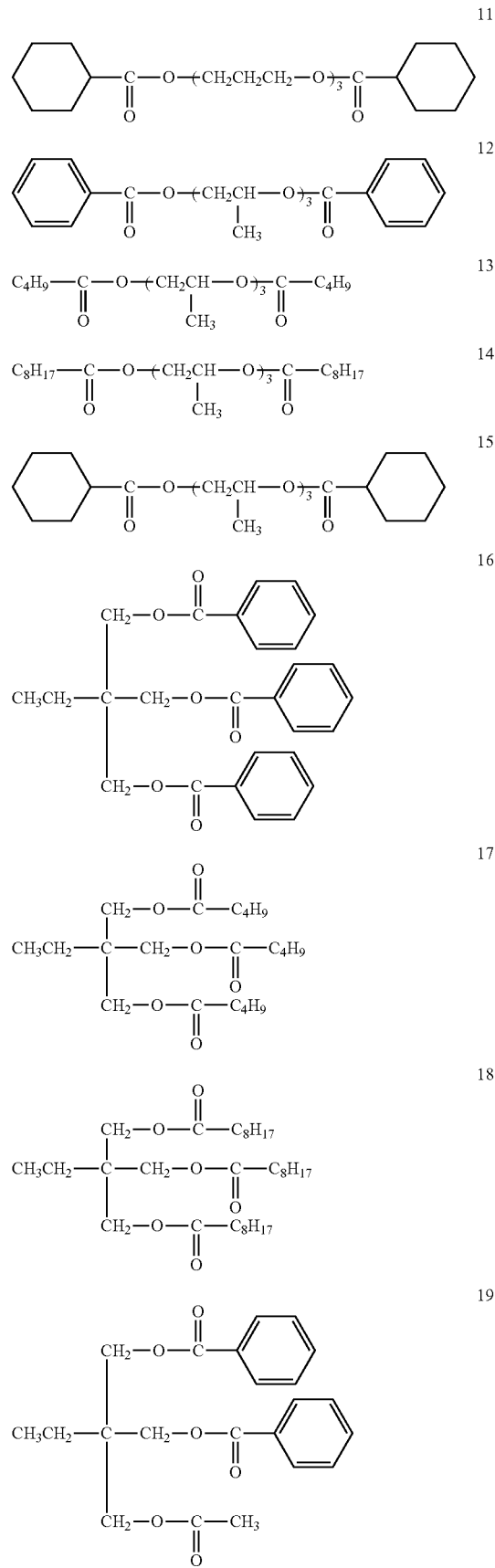

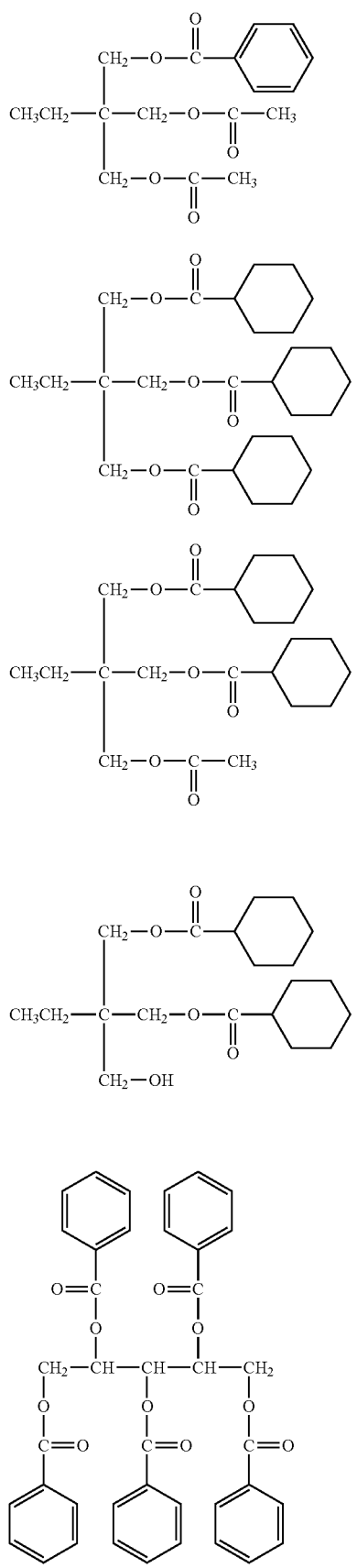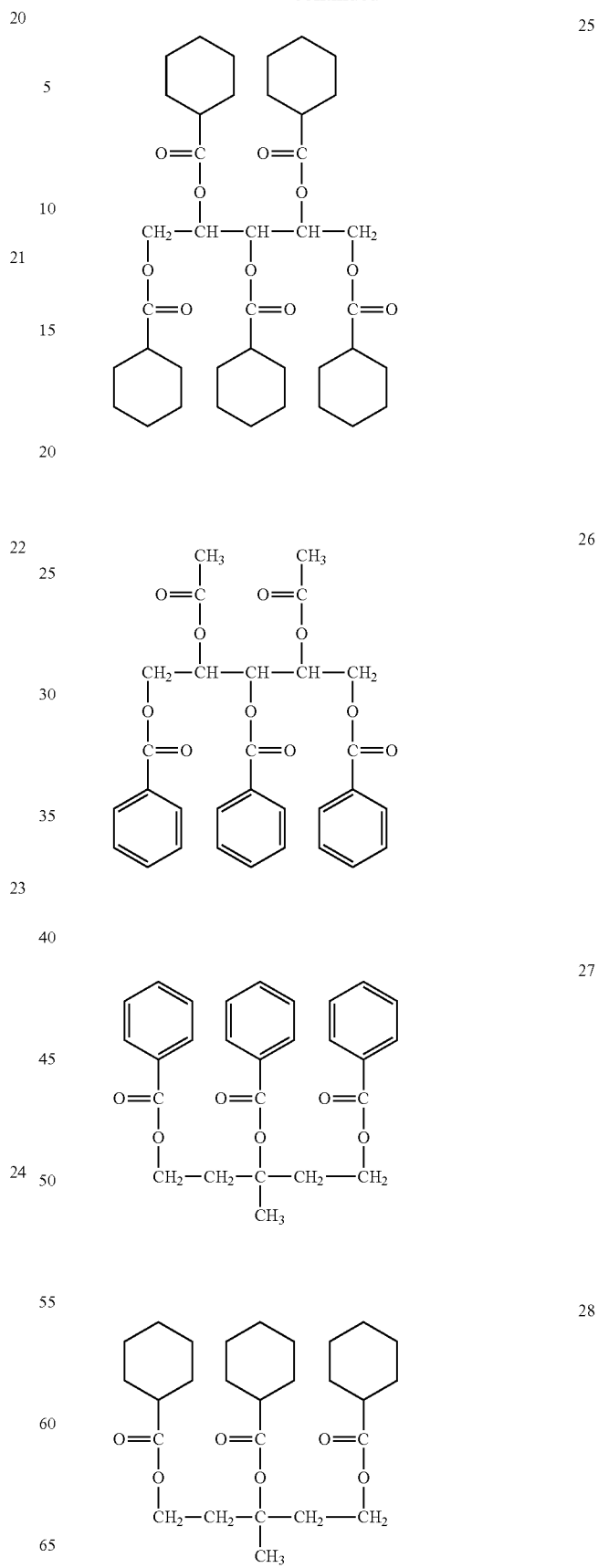

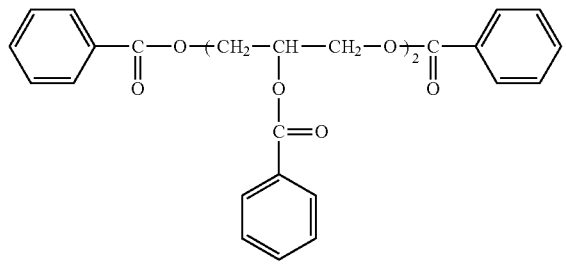

29

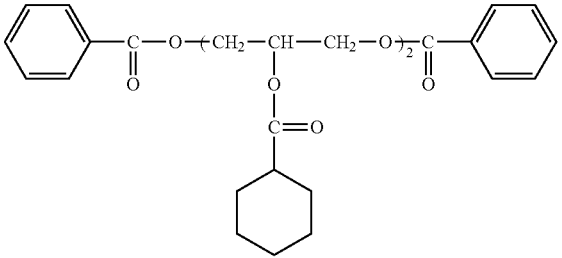

35

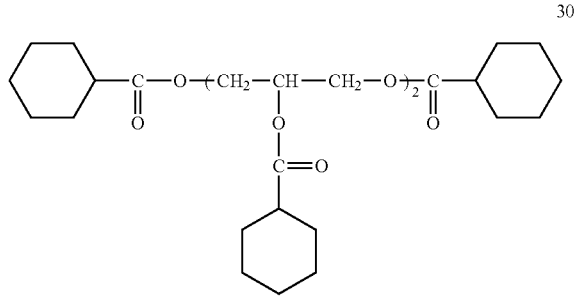

30

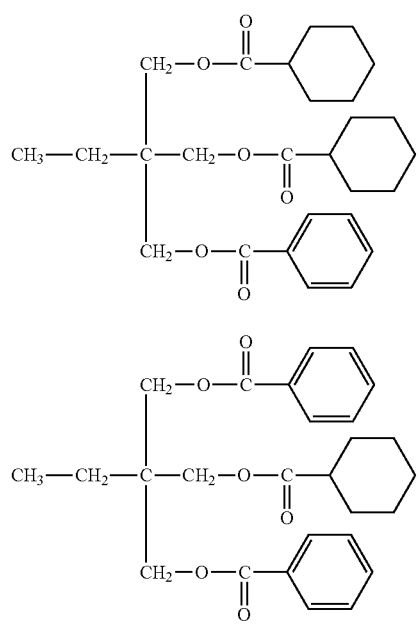

31

32

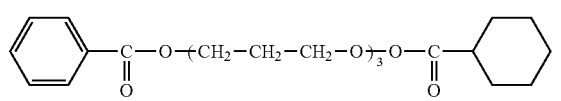

33

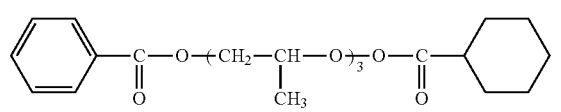

34

The glycolate type plasticizer is not specifically limited, however, alkylphthalylalkyl glycolates can be preferably used.

Examples of the alkylphthalylalkyl glycolates include methylphthalyl methyl glycolate, ethylphthalyl ethyl glycolate, propylphthalyl propyl glycolate, butylphthalyl butyl glycolate, octylphthalyl octyl glycolate, methylphthalyl ethyl glycolate, ethylphthalyl methyl glycolate, ethylphthalyl propyl glycolate, methylphthalyl butyl glycolate, ethylphthalyl butyl glycolate, butylphthalyl methyl glycolate, butylphthalyl ethyl glycolate, propylphthalyl butyl glycolate, butylphthalyl propyl glycolate, methylphthalyl octyl glycolate, ethylphthalyl octyl glycolate, octylphthalyl methyl glycolate, and octylphthalyl ethyl glycolate.

Examples of the phthalic acid ester type plasticizer include diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate, and dicyclohexyl terephthalate.

Examples of the citric acid type plasticizer include acetyltrimethyl citrate, acetyltriethyl citrate, and acetyltributyl citrate.

Examples of the fatty acid ester type plasticizer include butyl oleate, methylacetyl ricinoleate, and dibutyl sebacate.

Examples of the phosphoric acid ester type plasticizer include triphenyl phosphate, tricresyl phosphate, cresyldiphenyl phosphate, octyldiphenyl phosphate, diphenylbiphenyl phosphate, trioctyl phosphate, and tributyl phosphate.

Polyhydric carboxylic ester compound consists of an ester of polyhydric carboxylic acid with valency of 2 or more, and preferably with valency of 2 to 20, with alcohol. Further, the aliphatic polyhydric carboxylic acid preferably has valency of 2 to 20. In the case of aromatic polyhydric carboxylic acid and alicyclic polyhydric carboxylic acid, those with valency of 3 to 20 are preferable.

The polyhydric carboxylic acid is represented by the following formula (b).

$$R_{12}(COOH)_{m1}(OH)_{n1} \qquad \text{Formula (b):}$$

In the formula, $R_{12}$ is an organic group with valency of $(m1+n1)$; $m1$ is a positive integer of not less than 2; $n1$ is an integer of not less than 0; COOH group is a carboxyl group; and OH group is an alcoholic or phenolic hydroxyl group.

Preferred examples of the polyhydric carboxylic acid include the followings, but not limited thereto.

Aromatic polyhydric carboxylic acid having valency of 3 or more such as trimellitic acid, trimesic acid, or pyromellitic acid, and derivatives thereof; aliphatic polyhydric carboxylic acid such as succinic acid, adipic acid, azelaic acid, sebasic acid, oxalic acid, fumaric acid, maleic acid and tetrahydrophthalic acid; oxypolyhydric carboxylic acid such as tartaric acid, tartronic acid, malic acid and citric acid; can be preferably used. It is particularly preferable to use oxypolyhydric carboxylic acid from the viewpoint of improvement of reservability.

Alcohol used in the polyhydric carboxylic ester compound, which can be used in the present invention, is not specifically limited and alcohols and phenols well known in the art can be used.

For example, aliphatic saturated alcohol or aliphatic unsaturated alcohol with a straight chain or a side chain, having 1 to 32 carbon atoms, can be preferably used. Those with 1 to 20 carbon atoms are more preferable. Those with 1 to 10 carbon atoms are particularly preferable.

Further, alicyclic alcohol such as cyclopentanol or cyclohexanol or derivatives thereof, and aromatic alcohol such as benzyl alcohol or cinnamyl alcohol or derivatives thereof can be also preferably used.

When oxypolyhydric carboxylic acid is used as polyhydric carboxylic acid, an alcoholic or phenolic hydroxyl group of oxypolyhydric carboxylic acid may be esterified by use of monocarboxylic acid. Preferred examples of the monocarboxylic acid include the followings, but the present invention is not limited to them.

As aliphatic monocarboxylic acid, fatty acid with a straight chain or a side chain having 1 to 32 carbon atoms can be preferably used. Those with 1 to 20 carbon atoms are more preferable, and those with 1 to 10 carbon atoms are particularly preferable.

Examples of the preferred aliphatic monocarboxylic acid include saturated fatty acid such as acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecylic acid, stearic acid, nonadecanoic acid, arachidic acid, behenic acid, lignoceric acid, cerotinic acid, heptacosanoic acid, montanic acid, melissic acid and lacceric acid; and unsaturated fatty acid such as undecylenoic acid, oleic acid, sorbic acid, linoleic acid, linolenic acid and arachidonic acid.

Examples of preferred alicyclic monocarboxylic acid include cyclopentane carboxylic acid, cyclohexanoic acid, cyclooctane carboxylic acid, and derivatives thereof.

Examples of preferred aromatic monocarboxylic acid include those in which an alkyl group is introduced to a benzene ring of benzoic acid such as benzoic acid and toluic acid; aromatic monocarboxylic acid having at least two benzene rings such as biphenyl carboxylic acid, naphthalene carboxylic acid, or tetraline carboxylic acid; or derivatives thereof. Acetic acid, propionic acid, and benzoic acid are particularly preferable.

The molecular weight of polyhydric carboxylic acid ester compound is not particularly limited, but it is preferably 300 to 1,000 and more preferably in the range of 350 to 750. It is preferable to have a large molecular weight to make it difficult to evaporate and it is preferable to have a small molecular weight from the viewpoint of compatibility with cellulose acetate.

Alcohols that are used in the polyhydric carboxylic ester usable in the present invention may be either one type or a mixture of at least two types.

An acid value of the polyhydric carboxylic ester compound usable in the present invention is preferably not more than 1 mg KOH/g and more preferably not more than 0.2 mg KOH/g. By setting the acid value within the above-described range, variation of retardation due to environment is suppressed, and therefore desirable.

Meanwhile, the acid value refers to a milligram value of potassium hydroxide required to neutralize acid contained in 1 g of a sample (carboxyl groups existing in a sample). The acid value is measured based on JIS K0070.

Particularly preferred examples of the polyhydric carboxylic ester compound are described herein below, however, the present invention is not limited to them.

Examples thereof include triethyl citrate, tributyl citrate, acetyltriethyl citrate (ATEC), acetyltributyl citrate (ATBC), benzoyltributyl citrate, acetyltriphenyl citrate, acetyltribenzyl citrate, dibutyl tartrate, diacetyldibutyl tartrate, tributyl trimellitate, and tetrabutyl pyromellitate.

The plasticizer is preferably contained in an amount of 5 to 20% by mass relative to 100% by mass of the polarizing plate protection film. More preferably, it is 5 to 10% by mass. Meanwhile, for a case in which a plasticizer is contained in the second polarizing plate protection film, it is preferably contained together with a cellulose ester resin in the first optically anisotropic layer. For such case, the content of the plasticizer in the first optically anisotropic layer is preferably 5 to 10% by mass relative to 100% by mass of the cellulose ester resin.

<Sugar Ester Compound>

When the polarizing plate protection film further includes a cellulose ester resin, water resistance of the film can be improved as the hydrolysis of a cellulose ester resin is prevented by containing a sugar ester compound. Further, for attachment to a polarizer for constituting a polarizing plate, the film surface is subjected to a saponification treatment, but hydrolysis of the cellulose ester resin during the saponification treatment and elution into an alkali saponification solution accompanying the hydrolysis can be also prevented.

Examples of the sugar ester compound include:

$$(HO)_m\text{-}Q\text{-}(O\text{---}C(\!=\!O)\text{---}R)_l \qquad (5)$$

a compound represented by above formula (5).

In the formula (5), Q represents a monosaccharide or a disaccharide residue, R represents an aliphatic group or an aromatic group, m represents the total number of hydroxy group directly bound to the monosaccharide or disaccharide residue, l represents the total number of —(O—C(=O)—R) group directly bound to the monosaccharide or disaccharide residue, and $3 \leq m+l \leq 8$ and $l \neq 0$.

It is known that the compound having a structure represented by the formula (5) cannot be isolated as a single type of a compound with fixed number of hydroxy group (m) and fixed number of —(O—C(=O)—R) group (l) and a mixture containing several kinds with different m and l in the formula is obtained. As such, the performance as a mixture with varying number of hydroxy group (m) and number of —(O—C(=O)—R) group (l) is important, and in case of a cellulose acrylate film according to this embodiment, with regard to haze characteristics, it is preferably a compound having a structure represented by the formula (5) in which the mixing ratio between the component having m=0 and the component having m>0 is in the range of 45:55 to 0:100. Further, more preferably from the viewpoint of the performances and cost, the mixing ratio between the component having m=0 and the component having m>0 is in the range of 10:90 to 0.1:99.9. Meanwhile, the component having m=0 and the component having m>0 can be measured by a common method based on high performance liquid chromatography.

In the formula (5) above, Q represents a monosaccharide or a disaccharide residue. Specific examples of the monosaccharide include allose, altrose, glucose, mannose, gulose, idose, galactose, talose, ribose, arabinose, xylose, and lyxose.

Hereinbelow, the examples of the structure of the compound having a monosaccharide residue represented by the formula (5) are given, but the present invention is not limited those specific examples.

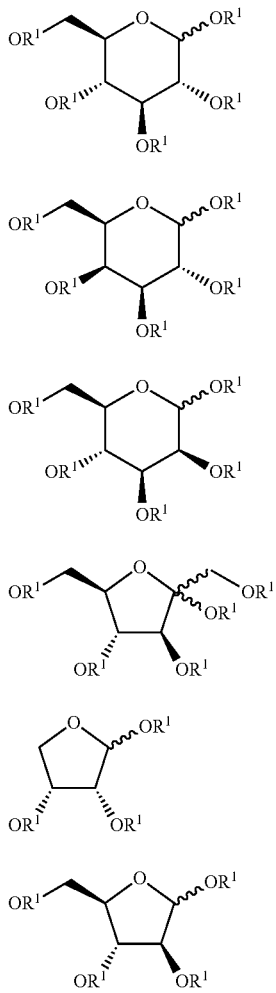

A-1

A-2

A-3

A-4

A-5

A-6

Specific examples of the disaccharide include trehalose, sucrose, maltose, cellobiose, gentiobiose, lactose, and isotrehalose.

Hereinbelow, the examples of the structure of the compound having a disaccharide residue represented by the formula (5) are given, but the present invention is not limited those specific examples.

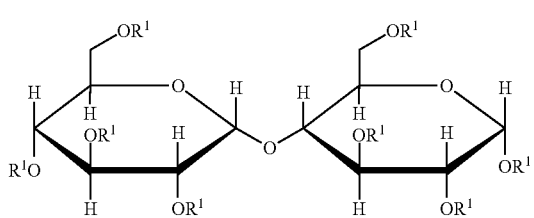

B-1

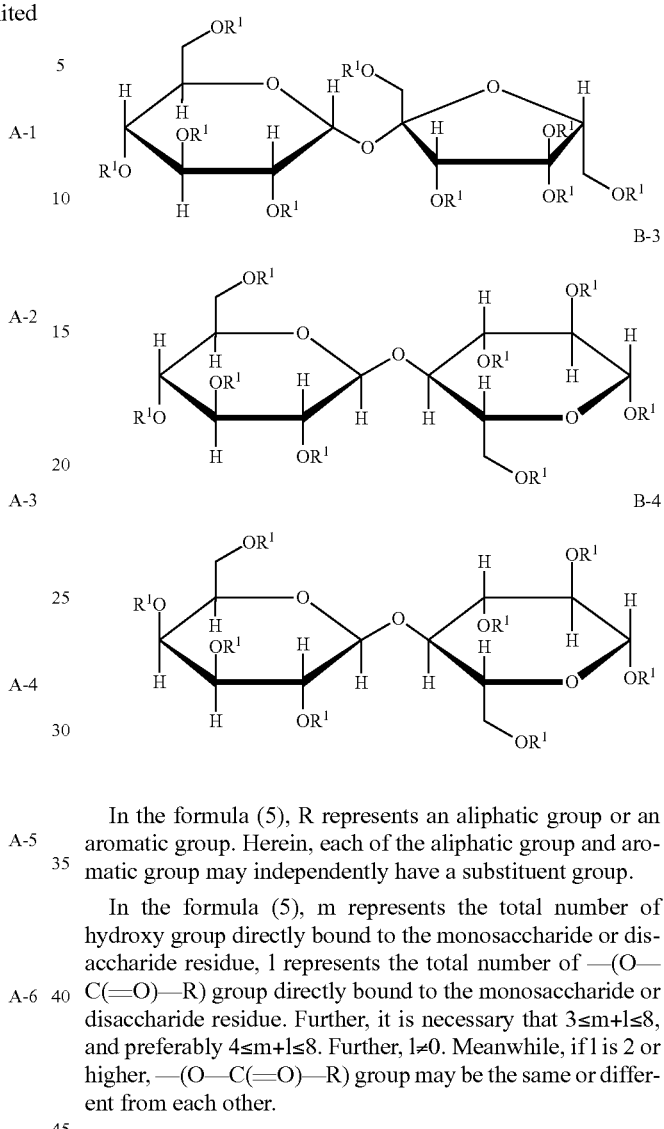

B-2

B-3

B-4

In the formula (5), R represents an aliphatic group or an aromatic group. Herein, each of the aliphatic group and aromatic group may independently have a substituent group.

In the formula (5), m represents the total number of hydroxy group directly bound to the monosaccharide or disaccharide residue, l represents the total number of —(O—C(=O)—R) group directly bound to the monosaccharide or disaccharide residue. Further, it is necessary that 3≤m+l≤8, and preferably 4≤m+l≤8. Further, l≠0. Meanwhile, if l is 2 or higher, —(O—C(=O)—R) group may be the same or different from each other.

Regarding the definition of R, the aliphatic group may be a linear chain, a branched chain, or cyclic, and it preferably has 1 to 25 carbon atoms, more preferably 1 to 20 carbon atoms, and particularly preferably 2 to 15 carbon atoms. Specific examples of the aliphatic group include methyl, ethyl, n-propyl, iso-propyl, cyclopropyl, n-butyl, iso-butyl, tert-butyl, amyl, iso-amyl, tert-amyl, n-hexyl, cyclohexyl, n-heptyl, n-octyl, bicyclooctyl, adamantyl, n-decyl, tert-octyl, dodecyl, hexadecyl, octadecyl, and didecyl.

Further, with regard to the definition of R, the aromatic group may be an aromatic hydrocarbon group or an aromatic heterocyclic group, and it is more preferably an aromatic hydrocarbon group. The aromatic hydrocarbon group preferably has 6 to 24 carbon atoms, and more preferably 6 to 12 carbon atoms. Specific examples of the aromatic hydrocarbon group include benzene, naphthalene, anthracene, biphenyl, and terphenyl. Benzene, naphthalene, and biphenyl are particularly preferred as the aromatic hydrocarbon group. The aromatic heterocyclic group preferably contains at least one of oxygen atom, nitrogen atom, and sulfur atom. Specific examples of the heterocycle include furan, pyrrole, thiophene, imidazole, pyrazole, pyridine, pyrazine, pyridazine, triazole, triazine, indole, indazole, purine, thiazoline, thiadiazole, oxazoline, oxazole, oxadiazole, quinoline, isoquinoline, phthalazine, naphthyridine, quinoxaline, quinazoline, cinnoline, pteridine, acridine, phenanthoroline, phenazine, tetrazole, benzimidazole, benzoxazole, benzthiazole, benztriazole and tetrazaindene. Pyridine, triazine and quinoline are particularly preferred as an aromatic heterocyclic group.

Next, preferred examples of the compound represented by the formula (5) are described below, but the present invention is not limited to those specific examples.

| Compound name | Sugar residue | Substituent group 1 ($OR^1$ group) Structure | Substitution degree (n) | Substituent group 2 (hydroxy group) Structure | Substitution degree (n) |
|---|---|---|---|---|---|
| a1 | B-2 | ![phenyl ketone] | 8 | —H | 0 |
| a2 |  |  | 7 |  | 1 |
| a3 |  |  | 6 |  | 2 |
| a4 |  |  | 5 |  | 3 |
| b1 | A-1 | —C(O)—CH₂— | 5 | —H | 0 |
| b2 |  |  | 4 |  | 1 |
| b3 |  |  | 3 |  | 2 |
| b4 |  |  | 2 |  | 3 |
| c1 | B-1 | p-methylbenzoyl | 8 | —H | 0 |
| c2 |  |  | 7 |  | 1 |
| c3 |  |  | 6 |  | 2 |
| c4 |  |  | 5 |  | 3 |
| d1 | A-5 | 3,4,5-trimethoxybenzoyl | 3 | —H | 0 |
| d2 |  |  | 2 |  | 1 |
| d3 |  |  | 4 |  | 2 |
| e1 | A-1 | —C(O)—CH₂—phenyl | 5 | —H | 0 |
| e2 |  |  | 4 |  | 1 |
| e3 |  |  | 3 |  | 2 |
| e4 |  |  | 2 |  | 3 |
| f1 | B-2 | —C(O)—CH₃ | 8 | —H | 0 |
| f2 |  |  | 7 |  | 1 |
| f3 |  |  | 6 |  | 2 |
| f4 |  |  | 5 |  | 3 |
| g1 | B-2 | —C(O)—Pr(i) | 8 | —C(O)—CH₃ | 0 |
| g2 |  |  | 7 |  | 1 |
| g3 |  |  | 6 |  | 2 |
| g4 |  |  | 5 |  | 3 |

Synthetic Example

Synthetic Example of Compound Represented by the Formula (5)

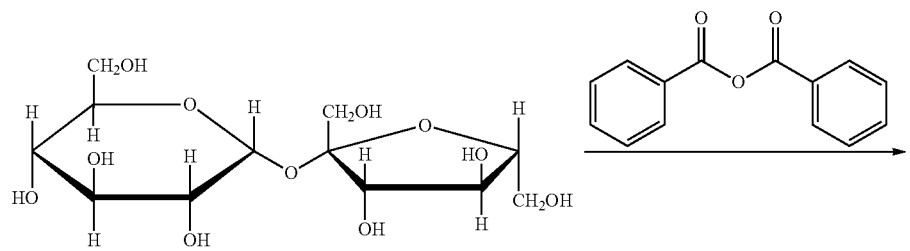

-continued

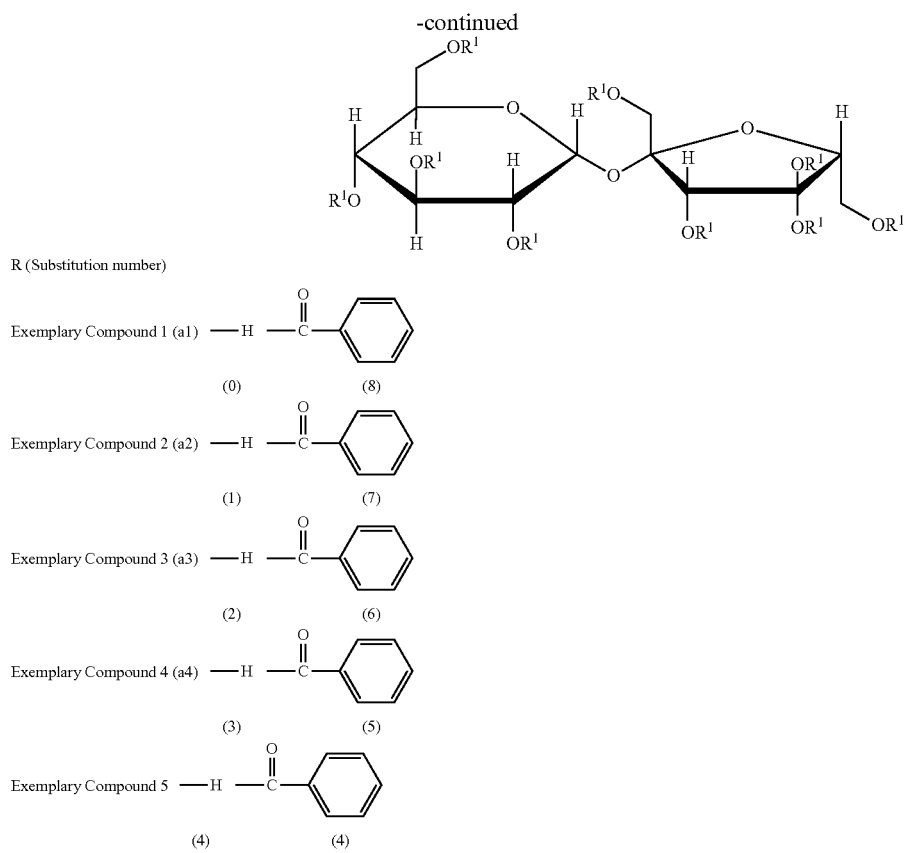

To a four-neck Kolben equipped with a stirrer, a reflux condenser, a thermometer, and an inlet for introducing nitrogen, 34.2 g (0.1 mol) of sucrose, 180.8 g (0.8 mol) of benzoic anhydride, and 379.7 g (4.8 mol) of pyridine were injected, the temperature was increased while bubbling nitrogen gas through an inlet for introducing nitrogen gas under stirring, and the esterification was performed for 5 hours at 70° C. Next, inside of the Kolben was de-pressurized to 4×10 Pa or lower. After removing excess pyridine at 60° C., inside of the Kolben was de-pressurized to 1.3×10 Pa or lower, and by increasing to 120° C., most of benzoic anhydride and the produced benzoic acid were distilled off. Thereafter, 1 liter of toluene and 300 g of a 0.5% by mass aqueous solution of sodium carbonate were added, stirred for 30 minutes at 50° C., and maintained for a while followed by fractionation of the toluene layer. Finally, the fractionated toluene layer was added with 100 g of water, washed with water for 30 minutes at room temperature, and the toluene layer was fractionated. Under reduced pressure (4×10$^2$ Pa or lower), by distilling off the toluene at 60° C., a mixture of Exemplary Compound 1, Exemplary Compound 2, Exemplary Compound 3, Exemplary Compound 4, and Exemplary Compound 5 was obtained. As a result of analyzing the obtained mixture by HPLC and LC-MASS, it was found that Exemplary Compound 1 is 7% by mass, Exemplary Compound 2 is 58% by mass, Exemplary Compound 3 is 23% by mass, Exemplary Compound 4 is 9% by mass, and Exemplary Compound 5 is 3% by mass. Meanwhile, by purifying part of the obtained mixture with silica gel column chromatography, Exemplary Compound 1, Exemplary Compound 2, Exemplary Compound 3, Exemplary Compound 4, and Exemplary Compound 5, each with purity of 100%, were obtained.

The sugar ester compound is preferably contained in an amount of 5 to 20% by mass, and more preferably 5 to 10% by mass relative to 100% by mass of the polarizing plate protection film. Meanwhile, when the sugar ester compound is contained in the second polarizing plate protection film, it is preferably contained with a cellulose ester resin in the first optically anisotropic layer. In such case, the content of the sugar ester compound in the first optically anisotropic layer is preferably 5 to 10% by mass relative to 100% by mass of the cellulose ester resin.

<Polyester>

The polarizing plate protection film also preferably contains the polyester described below.

(Polyester Represented by the Formula (d) or (e))

The cellulose acrylate film according to the present embodiment preferably contains the polyester which is represented by the formula (d) or (e).

$$B1\text{-}(G\text{-}A\text{-})_m G\text{-}B1 \qquad \text{Formula (d)}$$

(in the formula, B1 represents monocarboxylic acid, G represents a divalent alcohol, and A represents a dibasic acid. None of B1, G, and A contains an aromatic ring. m represents the number of repetition).

$$B2\text{-}(A\text{-}G\text{-})_n A\text{-}B2 \qquad \text{Formula (e)}$$

(in the formula, B2 represents monoalcohol, G represents a divalent alcohol, and A represents a dibasic acid. None of B2, G, and A contains an aromatic ring. n represents the number of repetition).

In the formulae (d) and (e), B1 represents a monocarboxylic acid component, B2 represents a monoalcohol component, G represents a divalent alcohol component, and A represents a dibasic acid component, which is synthesized from them. It is characterized in that none of B1, B2, G, and A contains an aromatic ring. m and n represent the number of repetition.

The monocarboxylic acid represented by B1 is not particularly limited, and aliphatic monocarboxylic acid, alicyclic monocarboxylic acid, or the like that are known in the field may be used.

Preferred examples of the monocarboxylic acid include the followings, but the present invention is not limited to them.

As for the aliphatic monocarboxylic acid, fatty acid having a straight chain or a side chain with 1 to 32 carbon atoms can be preferably used. Those with 1 to 20 carbon atoms are more preferable, and those with 1 to 12 carbon atoms are particularly preferable. Containing acetic acid is preferable in that the compatibility with cellulose acrylate is improved. It is also preferable to use a mixture of acetic acid and other monocarboxylic acid.

Preferable aliphatic monocarboxylic acid includes saturated fatty acid such as formic acid, acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecylic acid, stearic acid, nonadecanoic acid, arachidic acid, behenic acid, lignoceric acid, cerotinic acid, heptacosanoic acid, montanic acid, melissic acid and lacceric acid; and unsaturated fatty acid such as undecylenoic acid, oleic acid, sorbic acid, linoleic acid, linolenic acid and arachidonic acid.

The monoalcohol component represented by B2 is not particularly limited, and alcohols well known in the field can be used. For example, aliphatic saturated alcohol or aliphatic unsaturated alcohol having a straight chain or a side chain with 1 to 32 carbon atoms can be preferably used. Those with 1 to 20 carbon atoms are more preferable, and those with 1 to 12 carbon atoms are particularly preferable.

Examples of the divalent alcohol component represented by G include the followings, but the present invention is not limited to them. Examples thereof include ethylene glycol, diethylene glycol, 1,2-propylene glycol, 1,3-propylene glycol, 1,2-butylene glycol, 1,3-butylene glycol, 1,4-butylene glycol, 1,5-pentane diol, 1,6-hexane diol, 1,5-pentylene glycol, diethylene glycol, triethylene glycol, and tetraethylene glycol. Among them, ethylene glycol, 1,2-propylene glycol, 1,3-propylene glycol, 1,2-butylene glycol, 1,3-butylene glycol, 1,4-butylene glycol, 1,6-hexane diol, diethylene glycol, and triethylene glycol are preferable. Further, 1,3-propylene glycol, 1,4-butylene glycol 1,6-hexane diol, and diethylene glycol are preferably used.

A dibasic acid (dicarboxylic acid) component represented by A is preferably aliphatic dibasic acid and alicyclic dibasic acid, and at least one selected from aliphatic dibasic acid such as malonic acid, succinic acid, glutaric acid, adipic acid, pimeric acid, suberic acid, azelaic acid, sebacic acid, undecane dicarboxylic acid and dodecane dicarboxylic acid; and specifically, those having 4 to 12 carbon atoms as aliphatic dicarboxylic acid can be used. That is, two or more types of dibasic acid may be used in combination.

m and n represent the number of repetition and they are preferably not less than 1 and not more than 170.

(Polyester Represented by the Formula (f) or (g))

The polarizing plate protection film preferably contains the polyester which is represented by the formula (f) or (g).

$$B1\text{-}(G\text{-}A\text{-})_m G\text{-}B1 \qquad \text{Formula (f)}$$

(in the formula, B1 represents monocarboxylic acid with 1 to 12 carbon atoms, G represents a divalent alcohol with 2 to 12 carbon atoms, and A represents a dibasic acid with 2 to 12 carbon atoms. None of B1, G, and A contains an aromatic ring. m represents the number of repetition).

$$B2\text{-}(A\text{-}G\text{-})_n A\text{-}B2 \qquad \text{Formula (g)}$$

(in the formula, B2 represents monoalcohol with 1 to 12 carbon atoms, G represents a divalent alcohol with 2 to 12 carbon atoms, and A represents a dibasic acid with 2 to 12 carbon atoms. None of B2, G, and A contains an aromatic ring. n represents the number of repetition).

In the formulae (f) and (g), B1 represents a monocarboxylic acid component, B2 represents a monoalcohol component, G represents a divalent alcohol component with 2 to 12 carbon atoms, and A represents a dibasic acid component with 2 to 12 carbon atoms, which is synthesized from them. None of B1, G, and A contains an aromatic ring. m and n represent the number of repetition. Meanwhile, B1 and B2 have the same meaning as B1 and B2 in the aforementioned formula (d) or (e). Further, G and A correspond to the alcohol component or dibasic acid component with 2 to 12 carbon atoms of G and A in the aforementioned formula (d) or (e).

Number average molecular weight of the polyester is between 1000 and 10000. When the number average molecular weight is less than 1000, breakage may easily occur during stretching at high temperature and high stretching ratio. On the other hand, if it is higher than 10000, whitening caused by phase separation may easily increase.

Condensation polymerization of polyester is performed by means of an ordinary method. For example, it can be easily synthesized by a direct reaction of the above-described dibasic acid with glycol; a heat melt condensation method by a polyesterification reaction or an ester exchange reaction of the above-described dibasic acid or alkyl esters thereof, for example, methyl ester of dibasic acid with glycols; or a dehalogenating hydrogenation reaction of acid chloride of these acids and glycol. However, polyester having not so large weight average molecular weight is preferably synthesized by a direct reaction.

Polyester having a high distribution in the low molecular weight side has very good compatibility with cellulose acrylate, and it allows obtainment of a cellulose acrylate film having small water permeability and excellent transparency after film formation. As a method for controlling a molecular weight, a conventional method can be used without specific limitation. For example, although it may vary depending on a polymerization condition, when a method for blocking a molecular end with mono-valent acid or mono-hydric alcohol is used, the control of molecular weight can be possibly made by an addition amount of these monovalent raw material compounds. In this case, controlling the addition amount of the monovalent acid is preferable with respect to stability of polymer. Examples include acetic acid, propionic acid and butyric acid, and preferably selected are those which are not evaporated out of the system during condensed polymerization but can be easily evaporated out of the system when the reaction is stopped. Meanwhile, for such purpose, plural compounds may be used as a mixture. Further, in the case of a direct reaction, the weight average molecular weight can be controlled also by judging the timing to stop the reaction based on the quantity of water produced during the reaction. In addition to these, the molecular weight control can be possibly made also by biasing a mol number of glycol or dibasic acid which are charged, as well as by controlling the reaction temperature.

Polyester is preferably contained in an amount of 5 to 20% by mass, and more preferably in an amount of 5 to 15% by mass relative to 100% by mass of the polarizing plate protection film.

<UV Absorbing Agent>

The polarizing plate protection film may also contain an ultraviolet absorbing agent. The ultraviolet absorbing agent has an object to improve durability by absorbing ultraviolet rays of not longer than 400 nm, and in particular, transmittance at a wavelength of 370 nm is preferably not more than 10%, more preferably not more than 5%, and still more preferably not more than 2%. Meanwhile, when the phase difference film of the present invention contains an ultraviolet absorbing agent, it is preferable that two or more kinds of the ultraviolet absorbing agent are contained therein.

An ultraviolet absorbing agent used in the present invention is not specifically limited, however, examples thereof include an oxybenzophenone type compound, a benzotriazole type compound, a salicylic ester type compound, a benzophenone type compound, a cyano acrylate type compound, a triazine type compound, a nickel complex type compound and inorganic powder.

For example, listed are 5-chloro-2-(3,5-di-sec-butyl-2-hydroxylphenyl)-2H-benzotriazole, (2-2H-benzotriazole-2-yl)-6-(straight chain and side chain dodecyl)-4-methylphenol, 2-hydroxy-4-benzyloxybenzophenone and 2,4-benzyloxybenzophenone; and also Tinuvins, such as Tinuvin 109, Tinuvin 171, Tinuvin 234, Tinuvin 326, Tinuvin 327 and Tinuvin 328, which are all commercially available products manufactured Ciba Specialty Chemicals and they can be preferably used.

Ultraviolet absorbing agents used in the present invention are preferably a benzotriazole type ultraviolet absorbing agent, a benzophenone type ultraviolet absorbing agent and a triazine type ultraviolet absorbing agent, and specifically preferably a benzotriazole type ultraviolet absorbing agent and a benzophenone type ultraviolet absorbing agent. In addition to them, a disc form compound such as a compound having a 1,3,5-triazine ring is preferably used. Further, a polymer ultraviolet absorbing agent may also be preferably used as an ultraviolet absorbing agent, and polymer type ultraviolet absorbing agents described in Japanese Patent Application Laid-Open No. 6-148430 are specifically preferably used.

As an addition method of an ultraviolet absorbing agent, an ultraviolet absorbing agent may be added into a dope after having been dissolved in an organic solvent such as alcohol like methanol, ethanol and butanol, methylene chloride, methyl acetate, acetone and dioxolane; or may be directly added into a dope composition. Those insoluble in an organic solvent, such as inorganic powder, will be added into a dope after having been dispersed in an organic solvent and cellulose ester by use of a dissolver or a sand mill.

The ultraviolet absorbing agent is preferably contained in an amount of 0.5 to 5% by mass, and more preferably in an amount 0.5 to 3% by mass relative to 100% by mass of the polarizing plate protection film.

<Infrared Absorbing Agent>

The polarizing plate protection film may also contain an infrared absorbing agent. By having such constitution, the inverse wavelength dispersibility of a film can be controlled.

The infrared absorbing agent preferably has maximum absorption in the wavelength range of 750 to 1100 nm, and more preferably has maximum absorption in the wavelength range of 800 to 1000 nm. Further, infrared absorbing agent preferably has no substantial absorption in a visible region.

As for the infrared absorbing agent, it is preferable to use an infrared absorbing dye or an infrared absorbing pigment. It is particularly preferable to use an infrared absorbing dye.

The infrared absorbing dye includes an organic compound and an inorganic compound. It is preferable to use an infrared absorbing dye of organic compound. Examples of the organic infrared absorbing dye include a cyanine compound, a metal chelate compound, an aminum compound, a diimmonium compound, a quinone compound, a squarylium compound, and a methine compound. With regard to the infrared absorbing dye, there are descriptions in Color Material 61 [4], 215-226 (1998) and Chemical Engineering 43-53 (May, 1986).

When dye types are determined from the viewpoint of infrared absorbing activity or absorption spectrum, an infrared absorbing dye developed in a field of sensitizing materials for silver halide photography is excellent. Examples of the infrared absorbing dye developed in a field of sensitizing materials for silver halide photography include a dihydroperimidine squarylium dye (described in the specification of U.S. Pat. No. 5,380,635 and the specification of Japanese Patent Application Laid-Open No. 8-189817), a cyanine dye (described in each publication of Japanese Patent Application Laid-Open Nos. 62-123454, 3-138640, 3-211542, 3-226736, 5-313305, and 6-43583, the specification of Japanese Patent Application Laid-Open No. 7-269097, and the specification of European Patent No. 0430244), a pyrylium dye (described in each publication of Japanese Patent Application Laid-Open Nos. 3-138640 and 3-211542), a diimmonium dye (described in each publication of Japanese Patent Application Laid-Open Nos. 3-138640 and 3-211542), a pyrazolopyridone dye (described in the publication of Japanese Patent Application Laid-Open No. 2-282244), an indoaniline dye (described in each publication of Japanese Patent Application Laid-Open Nos. 5-323500 and 5-323501), a polymethine dye (described in each publication of Japanese Patent Application Laid-Open Nos. 3-26765 and 4-190343, and the specification of European Patent No. 377961), an oxonol dye (described in the specification of Japanese Patent Application Laid-Open No. 3-9346), an anthraquinone dye (described in the specification of Japanese Patent Application Laid-Open No. 4-13654), a naphthalocyanine pigment (described in the specification of U.S. Pat. No. 5,009,989), and a naphtholactam dye (described in the specification of European Patent No. 568267). Those infrared absorbing agents may be used either singly or in combination of two or more types.

The ultraviolet absorbing agent is preferably contained in an amount of 0.5 to 5% by mass, and more preferably in an amount 0.5 to 3% by mass relative to 100% by mass of the polarizing plate protection film.

<Mattifying Agent (Micro-Particles)>

The polarizing plate protection film preferably contains, in order to improve the handlability, inorganic micro-particles such as silicon dioxide, titanium dioxide, aluminum oxide, zirconium oxide, calcium carbonate, kaolin, talc, calcined calcium silicate, hydrated calcium silicate, aluminum silicate, magnesium silicate, or calcium phosphate, or crosslinked polymer as a mattifying agent. Among them, silicon dioxide is preferable in that the haze of a film can be lowered.

The average primary particle size of the micro-particles is preferably 20 nm or less, more preferably 5 to 16 nm, and particularly preferably 5 to 12 nm.

In the film, the micro-particles are preferably contained as secondary particles having a particle size of 0.1 to 5 μm. Preferred average particle size is 0.1 to 2 μm, and more preferably 0.2 to 0.6 μm. Accordingly, it is possible to form irregularities with height of 0.1 to 1.0 μm or so on the film, and as a result, a suitable sliding property can be given to a film surface.

Measurement of the average primary particle size of the micro-particles that are used in the present invention is carried out by performing observation of the particles with a transmission type electron microscope (magnification of 500, 000 to 2,000,000) to observe 100 particles, measuring the particle diameter, and obtaining the average value as an average primary particle size.

The apparent specific gravity of the micro-particles is preferably 70 g/liter or more, more preferably 90 to 200 g/liter, and particularly preferably 100 to 200 g/liter. Higher the apparent specific gravity is, it becomes easier to prepare a dispersion at high concentration, and thus it is preferable in that the haze and aggregates are improved. Further, it is particularly preferably used for preparing a dope with high solid matter content.

Silicon dioxide micro-particles with average primary particle size of 20 nm or less and apparent specific gravity of 70 g/liter or more can be obtained by, for example, calcining a mixture of vaporized silicon tetrachloride and hydrogen in air at 1000 to 1200° C. Further, they are commercially available under the product names of Aerosil R812, Aerosil 200V, and Aerosil R972V (all manufactured by Nippon Aerosil Co., Ltd.), and thus can be used.

The aforementioned apparent specific gravity is obtained by having a certain amount of silicon dioxide micro-particles in a mess cylinder, measuring the weight, and performing the calculation based on the following equation.

Apparent specific gravity(g/liter)=Mass of silicon dioxide(g)/Volume of silicon dioxide(liter)

The mattifying agent (micro-particles) is preferably contained in an amount of 0.1 to 2% by mass, and more preferably in an amount 0.1 to 1% by mass relative to 100% by mass of the polarizing plate protection film.

<Coloring Agent>

The polarizing plate protection film may contain a coloring agent. As described herein, "coloring agent" means a dye or a pigment. In the present invention, those with an effect of having a liquid crystal display image with blue color hue, or a property of adjusting yellow index or lowering haze are particularly preferable. Various dyes and pigments can be used as a coloring agent. However, an anthraquinone dye, an azo dye, and a phthalocyanine pigment are effective.

The coloring agent is preferably contained in an amount of 1 to 15 ppm by mass, and more preferably in an amount 1 to 10 ppm by mass relative to 100% by mass of the polarizing plate protection film.

According to the present invention, with regard to an IPS liquid crystal display device in which a phase difference film is used as a polarizing plate protection film at the liquid crystal cell side of a polarizing plate, which is arranged at the viewing side of IPS liquid crystal cell, the re-workability of the phase difference film can be improved at production of the display device as described above. Meanwhile, although the mechanism of obtaining such effect by having the constitution of the present invention is not entirely clear, it is believed that higher film strength (tension at break) is generally preferred for exhibiting the re-workability. In this regard, in order to exhibit the re-workability sufficient for a common optical film in laminate shape, it is necessary to increase the overall film thickness of a laminate film.

However, when the film thickness of a laminate film is increased, a difference in physical properties among each laminated film may become more prominent so that peeling may occur at lamination interface. On the other hand, by having a relatively thin polarizing plate protection film (that is, film thickness of 30 to 60 μm) while still maintaining a laminate film shape like the present invention, it is difficult to have a prominent difference in physical properties among each laminated film. As a result, it is believed that good re-workability is exhibited even though the strength of the film as a whole is not so high. However, the technical scope of the present invention is not affected at all by the aforementioned mechanism.

EXAMPLES

Hereinbelow, the present invention is specifically explained in view of examples, but the present invention is not limited to them.

<<Materials>>

<Polymer Having a Positive Intrinsic Birefringence>

In the present Examples, the resins A1 to A5 listed in the following Table 1 were used as a polymer having a positive intrinsic birefringence.

TABLE 1

| Resin | Resin (main) Type | Cellulose ester | | | Weight average molecular weight (Mw) | Remarks |
|---|---|---|---|---|---|---|
| | | Total substitution degree | Ac substitution degree | Pro substitution degree | | |
| A1 | Cellulose ester 1 | 1.6 | 0.1 | 1.5 | 115000 | Present invention |
| A2 | Cellulose ester 2 | 1.9 | 0.1 | 1.8 | 150000 | Present invention |
| A3 | Cellulose ester 3 | 2.2 | 1.1 | 1.1 | 170000 | Present invention |
| A4 | Cellulose ester 4 | 2.4 | 2.4 | — | 200000 | Present invention |
| A5 | Resin pellet 1 (lactone ring acryl) | — | — | — | 130000 | Comparative Example |

* "Ac" represents acetyl group and "Pro" represents propinoyl group.

Meanwhile, the resin pellet 1 (lactone ring acryl) of the resin A5 was synthesized according to the following method.

Synthetic Example of Resin Pellet 1

To a 30 L reaction vessel equipped with a stirrer, a temperature sensor, a condenser, and an inlet for introducing nitrogen, 5200 g of methyl methacrylate (MMA), 2500 g of methyl 2-(hydroxymethyl)acrylate (MHMA), 2300 g of benzyl methacrylate (BzMA), and 10000 g of toluene were charged. Next, while introducing nitrogen to the reaction vessel, content of the reaction vessel was heated to 105° C., and after starting reflux, the solution polymerization was performed under reflux (about 105 to 110° C.) while adding dropwise over 6 hours an initiator solution consisting of 12.0 g of t-amyl peroxyisononanoate and 100 g of toluene with simultaneous addition of 6.0 g of tertiary butylperoxyisononanoate (product name: LUPASOL 570, manufactured by Atofina Yoshitomi, Ltd.) as an initiator. After the dropwise addition of t-amyl peroxyisononanoate toluene solution, it was aged again for 2 hours.

The reaction rate of the obtained polymer was 96.4%, content of the MHMA structural unit in the polymer was 25.1% by mass, and content of the BzMA structural unit was 23.2% by mass.

To the obtained polymer solution, 20 g of a mixture of octyl phosphate/dioctyl phosphate (product name: Phoslex A-8, manufactured by Sakai Chemical Industry Co., Ltd.) was added and the cyclization condensation was performed for 2 hours under reflux (about 80 to 105° C.). Then, by using a heating medium at 240° C., the cyclization condensation was performed for 1.5 hours under pressure in an autoclave (maximum gauge pressure is up to approximately 1.6 MPa) at 240° C.

The polymer solution obtained by the cyclization condensation was added, at a treatment rate of 2.0 kg/hour in terms of resin amount, to a bent type screw biaxial extruder (φ=29.75 mm, L/D=30) with rear bent number of 1 and fore bent number of 4 at barrel temperature of 250° C., revolution number of 100 rpm, and vacuum level of 13.3 to 400 hPa (10 to 300 mmHg), and the cyclization condensation and devolatilization were performed in the extruder followed by extrusion to obtain transparent resin pellet 1 (resin A5).

Content of the BzMA structural unit in the obtained resin pellet 1 was 23.6% by mass, and the refractive index measured after producing a press film was 1.517.

<Polymer Having a Negative Intrinsic Birefringence>

In the present Examples, the resins B1 to B4 listed in the following Table 2 were used as a polymer having a negative intrinsic birefringence.

TABLE 2

| Resin | Resin (main) Type (constitutional ratio, mol %) | Weight average molecular weight (Mw) | Remarks |
|---|---|---|---|
| B1 | MMA/St/PMI = 7/2/1 | 150000 | Present invention |
| B2 | MMA/St/PMI = 6/3/1 | 140000 | Present invention |
| B3 | N-vinylcarbazole/irobornyl acrylate = 35/65 | 170000 | Comparative Example |
| B4 | Styrene/maleic anhydride = 85/15 | 200000 | Comparative Example |

* "MMA" represents methyl methacrylate,
"St" represents styrene, and
"PMI" represents N-phenylmaleimide, Meanwhile, the resins B1 and B2 were synthesized according to the following method.

Synthetic Example of Resin B1

To a reaction vessel device with a stirrer, a temperature sensor, a condenser, and an inlet for introducing nitrogen, 70 parts by mass of N-phenylmaleimide (PMI) and 490 parts by mass of methyl methacrylate (MMA) as monomers and 620 parts by mass of toluene as a polymerization solvent were charged. Next, while flushing with nitrogen, the temperature was increased to 105° C. When reflux was started due to the temperature increase, 1.1 parts by mass of t-amyl peroxyisononanoate (product name: LUPASOL 570, manufactured by Atofina Yoshitomi, Ltd.) were added as a polymerization initiator. Then, a mixture solution containing 140 parts by mass of styrene (St), 50 parts by mass of toluene, and 2.1 parts by mass of t-amyl peroxyisononanoate was added dropwise thereto over 2 hours, and the solution polymerization was performed again for 6 hours.

Next, the polymerization solution as obtained above was dried for 1 hour under reduced pressure at 240° C. to obtain transparent resin B1 consisting of MMA unit, St unit, and PMI unit. Composition of the resin B1 was as follows; MMA: St:PMI=70% by mass:20% by mass:10% by mass.

Synthetic Example of Resin B2

The solution polymerization was performed in the same manner as the Synthetic Example of resin B1 except that 420 parts by mass of MMA and 210 parts by mass of St were used as monomers.

Next, the polymerization solution as obtained above was dried for 1 hour under reduced pressure at 240° C. to obtain transparent resin B2 consisting of MMA unit, St unit, and PMI unit. Composition of the resin B2 was as follows; MMA: St:PMI=60% by mass:30% by mass:10% by mass.

<Acrylic Polymer with Weight Average Molecular Weight (Mw) of 500 to 10000>

In the present Examples, the resins D1 to D3 listed in the following Table 3 were used as an acrylic polymer with weight average molecular weight (Mw) of 500 to 10000.

TABLE 3

| | Compound (Constitutional ratio, mol %) | Weight average molecular weight (Mw) |
|---|---|---|
| D1 | MMA/ACMO = 70/30 | 5000 |
| D2 | MMA/VP = 80/20 | 5000 |
| D3 | MMA = 100 | 2500 |

*"MMA" represents methyl methacrylate,
"ACMO" represents acryloyl morpholine, and
"VP" represents N-vinyl-2-pyrrolidone.

<Polarizing Plate Protection Film 101 to 107>

In the present Examples, the following polarizing plate protection films 101 to 107 were used. Meanwhile, the following polarizing plate protection films 101 to 107 were used as any one of the first polarizing plate protection film, the third polarizing plate protection film, and the fourth polarizing plate protection film.

(Production of Polarizing Plate Protection Film 101)

The following materials were further dried while mixing them with a vacuum nauta mixer under mixing at 80° C. and 1 Torr for 3 hours. The obtained mixture was melt-mixed and pelletized at 235° C. by using a biaxial extruder.

Acrylic resin (methyl methacrylate/acryloyl morpholine=80/20 (molar ratio); Mw=100000; moisture ratio of 1000 ppm by drying at 90° C. for 3 hours) of 70 parts by mass
Cellulose ester resin (cellulose acetate propionate:total acyl group substitution degree 2.75, acetyl group substitution degree 0.19, propionyl group substitution degree 2.56, Mw=200000, moisture ratio of 500 ppm by drying at 100° C. for 3 hours) of 30 parts by mass TINUVIN 928 (manufactured by BASF JAPAN LTD.) of 1.1 parts by mass
ADEKA STAB PEP-36 (manufactured by ADEKA CORPORATION) of 0.25 parts by mass
IRGANOX 1010 (manufactured by BASF JAPAN LTD.) of 0.5 parts by mass
SUMILIZER GS (manufactured by Sumitomo Chemical Company, Limited) of 0.24 parts by mass
AEROSIL R972V (manufactured by Nippon Aerosil Co., Ltd.) of 0.27 parts by mass The obtained pellet was dried by circulating dehumidified air at 70° C. for 5 hours or longer. While maintaining the temperature of 100° C., it was introduced to a monoaxial extruder of the next step.

By using a monoaxial extruder, the pellet was melt-extruded at melting temperature of 240° C. from a T die onto the first cooling roll with surface temperature of 90° C. to have a film shape, and thus a 120 μm cast film was obtained. At that time, the film was pressed on the first cooling roll with an elastic touch roll which has a 2 mm thick metal surface.

The obtained film was first stretched by 60% at 175° C. in a conveying direction by using a stretching machine utilizing a speed difference in rolling. Next, it was introduced to a tenter having a pre-heating zone, a stretching zone, a holding zone, and a cooling zone (between each zone, a neutral zone is also included to ensure thermal insulation between zones) and stretched by 70% in a width direction at 175° C. After that, it was cooled to 30° C. and released from the clip. The clip grip part was cut to obtain the polarizing plate protection film 101 having film thickness of 20 μm.

(Production of Polarizing Plate Protection Film 102)
<Micro-Particle Dispersion>
Micro-particles (AEROSIL R972V manufactured by Nippon Aerosil Co., Ltd.) of 11 parts by mass
Ethanol of 89 parts by mass Above materials were stirred and mixed for 50 minutes using a dissolver and dispersed using a Manton Gaulin.
<Micro-Particle Additive Solution>

While being sufficiently stirred in a dissolution tank added with methylene chloride, it was slowly added with the micro-particle dispersion 1. Further, to have a pre-determined particle size of the secondary particles, dispersion was performed by using an attritor. The resultant was filtered through Fine Met NF manufactured by Nippon Seisen Co., Ltd. to produce the micro-particle additive solution 1.
Methylene chloride of 99 parts by mass
Micro-particle dispersion 1 of 5 parts by mass Main dope solution with the following composition was prepared. First, to a pressure dissolution tank, methylene chloride and ethanol were added. To the pressure dissolution tank added with the solvent, cellulose ester was added under stirring. It was completely dissolved by heating and stirring. It was then filtered by using AZUMI FILTER PAPER No. 244 manufactured by AZUMI FILTER PAPER Co., Ltd. to produce a main dope solution.
<Composition of Main Dope Solution>
Methylene chloride of 340 parts by mass
Ethanol of 64 parts by mass
Cellulose ester resin (cellulose triacetate: acetyl group substitution degree 2.9, Mw=180000, moisture ratio of 500 ppm by drying at 100° C. for 3 hours) of 86 parts by mass
Acrylic polymer (homopolymer of methyl acrylate, Mw=1000) of 10 parts by mass
Polyester (phthalic acid/adipic acid/1,2-propane diol/benzoic acid=25/25/25/25 (molar ratio)) of 4 parts by mass
Micro-particle additive solution 1 of 1 part by mass The above materials were added to a sealed main dissolution vessel and a dope solution was prepared by dissolving them under stirring.

On a stainless belt support, the solvent was evaporated until the residual solvent amount in the cast film became 75%. Subsequently, it was peeled from the stainless belt support with peeling tension of 130 N/m. The peeled film was stretched by 15% in width direction using a tenter while being heated at 165° C. The residual solvent was 15% at the start of stretching.

Subsequently, the drying zone was conveyed by plural rolls to terminate the drying. The drying temperature was 130° C. and the conveying tension was 100 N/m. Accordingly, the polarizing plate protection film 102 having film thickness of 40 μm was obtained.

(Production of Polarizing Plate Protection Film 103)

Main dope solution with the following composition was prepared. First, to a pressure dissolution tank, methylene chloride and ethanol were added. To the pressure dissolution tank added with the solvent, cellulose ester was added under stirring. It was completely dissolved by heating and stirring. It was then filtered by using AZUMI FILTER PAPER No. 244 manufactured by AZUMI FILTER PAPER Co., Ltd. to produce a main dope solution.
<Composition of Main Dope Solution>
Methylene chloride of 340 parts by mass
Ethanol of 64 parts by mass
Cellulose ester resin (cellulose triacetate: acetyl group substitution degree 2.9, Mw=180000, moisture ratio of 500 ppm by drying at 100° C. for 3 hours) 90 parts by mass
Polyester (terephthalic acid/adipic acid/ethylene glycol/propylene glycol=25/25/25/25 (molar ratio)) 10 parts by mass
Micro-particle additive solution 1 of 1 part by mass The above materials were added to a sealed main dissolution vessel and a dope solution was prepared by dissolving them under stirring.

On a stainless belt support, the solvent was evaporated until the residual solvent amount in the cast film becomes 75%. Subsequently, it was peeled from the stainless belt support with peeling tension of 130 N/m (residual solvent was 15% at peeling; no stretching treatment was performed). With regard to the peeled film, the drying zone was conveyed by plural rolls to terminate the drying. The drying temperature was 130° C. and the conveying tension was 100 N/m. Accordingly, the polarizing plate protection film 103 having film thickness of 60 μm was obtained.

(Production of Polarizing Plate Protection Film 104)
DELPET 80N (manufactured by Asahi Kasei Chemicals Corporation, Mw=100000, film thickness of 25 μm) was used as the polarizing plate protection film 104.

(Production of Polarizing Plate Protection Film 105)
FX4727 (manufactured by JSR Corporation, Mw=100000, film thickness of 20 μm) was used as the polarizing plate protection film 105.

(Production of Polarizing Plate Protection Film 106)
First, the following dope composition was produced.
Cellulose triacetate (cellulose triacetate synthesized from cotton linter, acetyl group substitution degree 2.88, Mn=140000) of 90 parts by mass
Ester compound of 10 parts by mass
TINUVIN 928 (manufactured by BASF JAPAN LTD.) of 2.5 parts by mass
Diluted dispersion of silicon dioxide of 4 parts by mass
Methylene chloride of 432 parts by mass
Ethanol of 38 parts by mass The above materials were added to a sealed container, heated, and completely dissolved under stirring. It was then filtered by using AZUMI FILTER PAPER No. 24 manufactured by AZUMI FILTER PAPER Co., Ltd. to produce a dope composition. Meanwhile, the ester compound and diluted dispersion of silicon dioxide were synthesized and produced as described below.

<Synthesis of Ester Compound>

251 g of 1,2-propyleneglycol, 278 g of phthalic anhydride, 91 g of adipic acid, 610 g of benzoic acid, and 0.191 g of tetraisopropyl titanate as an esterification catalyst were added to a 2 L four neck flask equipped with a thermometer, a stirrer, and a slow condenser, and slowly heated with stirring under nitrogen stream until it reached 230° C. Dehydration condensation was performed for 15 hours. After the reaction is completed, the ester compound was obtained by distilling off unreacted 1,2-propylene glycol at 200° C. The obtained ester compound has acid number of 0.10 and number average molecular weight of 450.

<Preparation of Diluted Dispersion of Silicon Dioxide>

AEROSIL R812 (manufactured by Nippon Aerosil Co., Ltd.; average size of primary particles: 7 nm) of 10 parts by mass Ethanol of 90 parts by mass Above materials were stirred and mixed for 30 minutes using a dissolver and dispersed using a Manton Gaulin to obtain a dispersion of silicon dioxide. To the obtained dispersion of silicon dioxide, 88 parts by mass of methylene chloride were added under stirring and mixed and stirred for 30 minutes using a dissolver. By filtering using a filtering device for diluted solution of micro-particle dispersion (manufactured by Advantec Toyo Kaiha, Ltd.; TCW-PPS-1N, polypropylene wind cartridge filter), a diluted dispersion of silicon dioxide was prepared.

Subsequently, the dope composition produced above was evenly cast on a stainless band support of a band casting device. On a stainless band support, the solvent was evaporated until the residual solvent amount became 100%, and it was peeled from the stainless band support. The solvent in the peeled web was evaporated at 35° C., and a slit with 1.65 m width was prepared and dried at drying temperature of 160° C. (heat treatment temperature, also referred to as stretching temperature) while maintaining the width using a tenter.

The residual solvent amount was 20% at the beginning of drying. After that, drying was performed for 15 minutes while the inside of the drying device at 120° C. was conveyed by plural rolls. After that, a knurling (width of 15 mm and height of 10 μm) was performed for both ends of film and it was wound around a core to obtain the polarizing plate protection film 106. Residual solvent amount in the obtained polarizing plate protection film was 0.2%, film thickness was 25 μm, and winding number was 6000 m. Meanwhile, the stretching ratio in MD direction (conveying direction), which is calculated from revolution number of a stainless band support and operation rate of a tenter, was 1.10 (that is, stretching ratio of 10%).

(Production of Polarizing Plate Protection Film 107)

As the polarizing plate protection film 107, Konica Minolta Tac KC4UY (manufactured by KONICA MINOLTA ADVANCED LAYERS, INC.; film thickness of 40 μm) was used by itself.

<Polarizing Plate Protection Film 201 to 215>

In the present Examples, the following polarizing plate protection films 201 to 215 were used. Meanwhile, the following polarizing plate protection film 201 to 215 are a phase difference film and used as the second polarizing plate protection film.

(Production of Polarizing Plate Protection Film 201)

70 moles of the resin A1 described in the above Table 1 and 30 moles of the resin D1 described in the above Table 3 were further dried under mixing for 3 hours at 80° C., 133 Pa using a vacuum nauta mixer. At that time, the following additives were also added and mixed.

ADEKA STAB PEP-36 (manufactured by ADEKA CORPORATION) of 0.25 parts by mass

IRGANOX 1010 (manufactured by BASF JAPAN LTD.) of 0.5 parts by mass

SUMILIZER GS (manufactured by Sumitomo Chemical Company, Limited) of 0.24 parts by mass AEROSILR972V (manufactured by Nippon Aerosil Co., Ltd.) of 0.27 parts by mass The obtained mixture was melt-mixed and pelletized at 235° C. by using a biaxial extruder. By using a monoaxial extruder, the pellet (moisture ratio of 50 ppm) was melt-extruded at melting temperature of 240° C. from a T die onto the first cooling roll with surface temperature of 90° C. to have a film shape, and thus a 55 μm cast film was obtained. At that time, the film was pressed on the first cooling roll with an elastic touch roll which has a 2 mm thick metal surface.

The obtained film was stretched by 30% at 150° C. in a width direction after being introduced to a tenter having a pre-heating zone, a stretching zone, a holding zone, and a cooling zone (between each zone, a neutral zone is also included to ensure thermal insulation between zones). After that, the clip grip part was cut to obtain a substrate layer having film thickness of 20 μm. Meanwhile, measurement of refractive index of the obtained film was carried out using the Abbe refractometer-4T (produced by ATAGO Co., Ltd,) employing a multi-wavelength light source. When the refractive index in the stretching direction is designated as Nx, and the refractive index in in-plane direction perpendicular to it as Ny, it was (Nx−Ny)>0, indicating that it has a positive intrinsic birefringence.

Subsequently, 100 parts by mass of the resin B2 described in the above Table 2 was dried for 3 hours at 80° C., 133 Pa using a vacuum nauta mixer.

The resin after the drying was melt-mixed and pelletized at 270° C. by using a biaxial extruder. By using a monoaxial extruder, the pellet (moisture ratio of 50 ppm) was melt-extruded from a T die onto the substrate layer prepared above to have a film shape with film thickness of 25 μm, and thus a laminate was obtained.

The obtained laminate was stretched by 30% by using a longitudinal stretching device under heating at 150° C., and thus the polarizing plate protection film 201 was obtained. Meanwhile, film thickness of the first optically anisotropic layer (that is, a layer derived from substrate layer, containing the polymer having a positive intrinsic birefringence) after post-stretching was 15 μm. Further, film thickness of the second optically anisotropic layer (that is, a layer containing the polymer having a negative intrinsic birefringence) after post-stretching was 18 μm.

(Production of Polarizing Plate Protection Film 202 to 210)

The polarizing plate protection films 202 to 210 were produced in the same manner as the production of the aforementioned polarizing plate protection film 201 except that the type of the polymer having a positive intrinsic birefringence and polymer having a negative intrinsic birefringence, compositional ratio between the polymer having a positive intrinsic birefringence and acrylic polymer, and the stretching conditions for the first and second stretching (stretching temperature and stretching ratio) are changed as listed in the following Table 4.

(Production of Polarizing Plate Protection Films 211 to 213)

The type of the polymer having a positive intrinsic birefringence and polymer having a negative intrinsic birefringence, compositional ratio between the polymer having a positive intrinsic birefringence and acrylic polymer, and the stretching conditions for the first and second stretching (stretching temperature and stretching ratio) were changed as listed in the following Table 4.

Meanwhile, as a polymer having a negative intrinsic birefringence, the resin B3 (that is, copolymer of N-vinylcarbazole and isobornyl acrylate—35:65 (mass ratio)) listed in the Table 2 was used. However, forming a layer containing the resin B3 on the substrate layer and production of a laminate using it were performed as follows.

First, 35 parts by mass of N-vinylcarbazole, 65 parts by mass of isobornyl acrylate, and 3 parts by mass of 1-hydroxycyclohexylphenyl ketone (manufactured by BASF Japan Ltd., IRGACURE 184D) as a photopolymerization initiator were mixed to obtain a solvent free type polymerization curable composition.

Next, on a surface of the substrate layer which had been prepared in advance, the polymerization curable composition obtained from above was applied by using a bar coater such that coating film thickness is 20 μm. Subsequently, the polymerization curable composition was irradiated with ultraviolet light under nitrogen atmosphere to obtain a laminate in a state of before post-stretching. Meanwhile, for ultraviolet irradiation, an ultraviolet illuminator manufactured by USHIO INC. was used.

(Production of Polarizing Plate Protection Film 214)

For producing the polarizing plate protection film 214, the resin A5 described in Table 1 was used as a polymer having a positive intrinsic birefringence and no acrylic polymer was used. Further, film thickness of the first optically anisotropic layer and the second optically anisotropic layer was adjusted to 50 μm and 10 μm, respectively. Except these points, the polarizing plate protection film 214 was obtained in the same manner as the production of the aforementioned polarizing plate protection film 213.

(Production of Polarizing Plate Protection Film 215)

For producing the polarizing plate protection film 215, the resin B4 described in Table 1 was used as a polymer having a negative intrinsic birefringence. Further, film thickness of the second optically anisotropic layer was adjusted to 15 μm. Meanwhile, forming a layer containing the resin B4 on the substrate layer and production of a laminate using it were performed as follows.

The resin B4 was melt-extruded using a T die attached extruder having a screw and extruded from a T die having a width of 110 mm. By forming a coating film on a surface of the substrate layer which had been prepared in advance, a laminate was obtained.

Except these points, the polarizing plate protection film 215 was obtained in the same manner as the production of the aforementioned polarizing plate protection film 214.

TABLE 4

| Polarizing plate protection film No. | First optically anisotropic layer | | | | | Second optically anisotropic layer | | | |
|---|---|---|---|---|---|---|---|---|---|
| | Type | Compositional ratio (molar ratio) | Temperature for stretching (C. °) | TD ratio (%) | Film thickness (after TD + MD stretching) (μm) | Type | Film thickness (after MD stretching) (μm) | Condition for post-stretching | |
| | | | | | | | | Temperature (C. °) | MD ratio (%) |
| 201 | A1/D1 | 7/3 | 150 | 30 | 15 | B2 | 18 | 150 | 30 |
| 202 | A1/D2 | 7/3 | 150 | 30 | 15 | B2 | 18 | 150 | 30 |
| 203 | A1/D3 | 7/3 | 150 | 30 | 15 | B2 | 18 | 150 | 30 |
| 204 | A2/D1 | 7/3 | 140 | 30 | 18 | B2 | 23 | 140 | 30 |
| 205 | A2/D2 | 7/3 | 140 | 30 | 18 | B2 | 23 | 140 | 30 |
| 206 | A2/D3 | 7/3 | 140 | 30 | 18 | B2 | 20 | 140 | 30 |
| 207 | A3/D1 | 8/2 | 130 | 30 | 22 | B1 | 25 | 130 | 30 |
| 208 | A3/D2 | 8/2 | 130 | 30 | 22 | B1 | 25 | 130 | 30 |
| 209 | A3/D3 | 8/2 | 130 | 30 | 22 | B2 | 20 | 130 | 30 |
| 210 | A4/D3 | 7/3 | 150 | 30 | 30 | B1 | 30 | 150 | 30 |
| 211 | A1/D2 | 7/3 | 150 | 30 | 15 | B3 | 20 | 150 | 30 |
| 212 | A1/D3 | 7/3 | 150 | 30 | 15 | B3 | 20 | 150 | 30 |
| 213 | A4/D2 | 8/2 | 150 | 30 | 30 | B3 | 15 | 150 | 30 |
| 214 | A5 | — | 150 | 30 | 50 | B3 | 10 | 150 | 30 |
| 215 | A5 | — | 150 | 30 | 50 | B4 | 15 | 150 | 30 |

<Retardation (Ro, Rth) of the Second Polarizing Plate Protection Film>

Measurement of in-plane direction retardation (Ro1, Ro2) and thickness direction retardation (Rt1, Rt2) of each of the first optically anisotropic layer and the second optically anisotropic layer was performed for (the second) polarizing plate protection films 201 to 215 produced above. Further, by adding Ro1 and Ro2, the in-plane direction retardation value of the laminate was calculated, and by adding Rt1 and Rt2, the thickness direction retardation value of the laminate was calculated. The results are listed in the following Table 5.

TABLE 5

| Polarizing plate protection film | First optically anisotropic layer | | Second optically anisotropic layer | | Laminate | |
|---|---|---|---|---|---|---|
| Polarizing plate protection film | Ro1 (nm) | Rt1 (nm) | Ro2 (nm) | Rt2 (nm) | Ro3 (nm) | Rt3 (nm) |
| 201 | 0 | 90 | 120 | −110 | 120 | −20 |
| 202 | 0 | 90 | 120 | −110 | 120 | −20 |
| 203 | 0 | 90 | 120 | −110 | 120 | −20 |
| 204 | 0 | 90 | 130 | −120 | 130 | −30 |
| 205 | 0 | 90 | 130 | −120 | 130 | −30 |
| 206 | 0 | 90 | 125 | −115 | 125 | −25 |
| 207 | 0 | 90 | 125 | −120 | 125 | −30 |
| 208 | 0 | 90 | 125 | −120 | 125 | −30 |
| 209 | 0 | 90 | 125 | −115 | 125 | −25 |
| 210 | 0 | 90 | 135 | −105 | 135 | −15 |
| 211 | 0 | 90 | 125 | −100 | 125 | −10 |
| 212 | 0 | 90 | 125 | −100 | 125 | −10 |
| 213 | 0 | 90 | 160 | −120 | 160 | −30 |
| 214 | 0 | 70 | 140 | −100 | 140 | −30 |
| 215 | 0 | 70 | 140 | −90 | 140 | −20 |

<<Evaluation of Re-Workability of Polarizing Plate>>

The polarizing plate protection films 101 to 107 and 201 to 215, which had been produced and prepared in the above, were combined as described in the following Table 6 and attached by using a an aqueous solution of a polyvinyl alcohol such that it sandwiched each of two polarizers, and thus a polarizing plate was produced.

Re-workability of the second polarizing plate protection film produced above was evaluated as follows. The results are listed in the following Table 6.

(Method for Producing Polarizing Plate with an Adhesive Layer)

First, a polarizing plate with an adhesive layer was produced according to the following procedures.

Specifically, to a four neck flask equipped with a stirring wing, a thermometer, an inlet for introducing nitrogen gas, and a condenser, 74.9 parts of butyl acrylate, 20 parts of benzyl acrylate, 5 parts of acrylic acid, 0.1 part of 4-hydroxybutyl acrylate, and 0.1 part of 2,2'-azobisisobutyronitrile as a polymerization initiator were added with 100 parts of ethyl acetate (50% monomer concentration) and flushed with nitrogen by adding nitrogen gas under slow stirring. The polymerization was performed for 8 hours while the liquid temperature inside the flask is maintained at 55° C. or so to produce an acrylic polymer solution with weight average molecular weight (Mw) of 2,040,000 and Mw/Mn=3.2.

To 100 parts of the solid matter of the acrylic polymer solution obtained from above, 0.45 part of an isocyanate cross-linking agent (COLONATE L, manufactured by NIPPON POLYURETHANE INDUSTRY CO., LTD., tolylene-diisocyanate adduct of trimethylol propane), 0.1 part of benzoyl peroxide (manufactured by NOF CORPORATION, Nyper BMT), and 0.1 part of a silane coupling agent (manufactured by Shin-Etsu Chemical Co., Ltd., KBM403) were added to prepare a solution of an acrylic adhesive composition (solid content of 11%).

Subsequently, the acrylic adhesive solution was coated on a single surface of silicone-treated polyethylene terephthalate (PET) film with thickness of 38 μm (MRF38, manufactured by Mitsubishi Chemical Polyester Film, Inc.) such that the thickness of the adhesive layer was 23 μm after drying. According to a drying treatment for 1 minute at 155° C., an adhesive layer was formed.

On the polarizing plate side, the under coating agent was coated using a wire bar to form a under coat layer (thickness: 100 nm). As the under coating agent, a solution containing a thiophene polymer (trade name: "Denatron P521-AC", manufactured by Nagase ChemteX Corporation), which had been diluted with a mixture solution of water and isopropyl alcohol to have solid content of 0.6% by weight, was used. Subsequently, by transferring a silicone-treated PET film having an adhesive layer formed thereon to the under coat layer, a polarizing plate having an adhesive layer was produced.

(Evaluation Using Polarizing Plate with Adhesive Layer)

The polarizing plate having an adhesive layer as obtained by the above procedures were attached on a glass plate by using a laminator. Subsequently, it was subjected to an autoclave treatment for 15 minutes at 50° C., 5 atm and used as a test sample. From one corner of the polarizing plate, peeling was performed in diagonal 90-degree direction and the determination was made based on the following criteria.

(Criteria for Re-Workability Evaluation)

⊙: Peeling can be made while films are closely adhered to each other, and fogginess on a glass surface or a residue of adhesives is not observed.

○: Peeling can be made while films are closely adhered to each other, and fogginess on a glass surface or a residue of adhesives is hardly observed.

Δ: Slight peeling between films is observed at corner part.

x: Peeling between films is observed.

TABLE 6

| Liquid crystal display device | F1 | F2 | F3 | F4 | Re-workability | Remarks |
|---|---|---|---|---|---|---|
| 301 | 106 | 201 | 101 | 106 | ⊙ | Present invention |
| 302 | 106 | 202 | 101 | 106 | ⊙ | Present invention |
| 303 | 106 | 203 | 101 | 106 | ⊙ | Present invention |
| 304 | 106 | 204 | 101 | 106 | ⊙ | Present invention |
| 305 | 106 | 205 | 101 | 106 | ⊙ | Present invention |
| 306 | 106 | 206 | 101 | 106 | ⊙ | Present invention |
| 307 | 106 | 207 | 101 | 106 | ⊙ | Present invention |
| 308 | 106 | 208 | 101 | 106 | ⊙ | Present invention |
| 309 | 106 | 209 | 101 | 106 | ⊙ | Present invention |
| 310 | 106 | 210 | 101 | 106 | ⊙ | Present invention |
| 311 | 101 | 201 | 101 | 101 | ⊙ | Present invention |
| 312 | 101 | 202 | 101 | 101 | ⊙ | Present invention |
| 313 | 101 | 203 | 101 | 101 | ⊙ | Present invention |
| 314 | 101 | 204 | 101 | 101 | ⊙ | Present invention |
| 315 | 101 | 205 | 101 | 101 | ⊙ | Present invention |
| 316 | 101 | 206 | 101 | 101 | ⊙ | Present invention |
| 317 | 101 | 207 | 101 | 101 | ⊙ | Present invention |
| 318 | 101 | 208 | 101 | 101 | ⊙ | Present invention |

TABLE 6-continued

| Liquid crystal display device | F1 | F2 | F3 | F4 | Re-workability | Remarks |
|---|---|---|---|---|---|---|
| 319 | 101 | 209 | 101 | 101 | ⊚ | Present invention |
| 320 | 101 | 210 | 101 | 101 | ⊚ | Present invention |
| 321 | 106 | 201 | 104 | 106 | ○ | Present invention |
| 322 | 106 | 201 | 105 | 106 | ○ | Present invention |
| 323 | 106 | 205 | 104 | 106 | ○ | Present invention |
| 324 | 106 | 205 | 105 | 106 | ○ | Present invention |
| 325 | 106 | 208 | 104 | 106 | ○ | Present invention |
| 326 | 106 | 208 | 105 | 106 | ○ | Present invention |
| 327 | 106 | 210 | 104 | 106 | ○ | Present invention |
| 328 | 106 | 210 | 105 | 106 | ○ | Present invention |
| 329 | 106 | 214 | 101 | 106 | Δ | Comparative Example |
| 330 | 106 | 215 | 101 | 106 | Δ | Comparative Example |
| 331 | 107 | 211 | 101 | 106 | Δ | Comparative Example |
| 332 | 107 | 213 | 101 | 106 | Δ | Comparative Example |
| 333 | 107 | 214 | 101 | 107 | Δ | Comparative Example |
| 334 | 107 | 215 | 101 | 107 | Δ | Comparative Example |
| 335 | 107 | 214 | 102 | 107 | X | Comparative Example |
| 336 | 107 | 214 | 103 | 107 | X | Comparative Example |
| 337 | 107 | 214 | 104 | 107 | X | Comparative Example |
| 338 | 107 | 214 | 105 | 107 | X | Comparative Example |

According to the present invention, with regard to an IPS liquid crystal display device in which a phase difference film is used as a polarizing plate protection film (the second polarizing plate protection film) at the liquid crystal cell side of a polarizing plate, which is arranged at the viewing side of IPS liquid crystal cell, the re-workability of the phase difference film can be improved at production of the display device as confirmed in the results listed in Table 6.

What is claimed is:

1. An IPS mode liquid crystal display device comprising an IPS mode liquid crystal cell and a first polarizing plate and a second polarizing plate, which sandwich the IPS mode liquid crystal cell,
wherein the first polarizing plate is positioned at the viewing side of the IPS mode liquid crystal cell and is provided from the viewing side with a first polarizing plate protection film, a polarizer, and a second polarizing plate protection film,
the second polarizing plate is positioned at the reverse side from the viewing side of the IPS mode liquid crystal cell and is provided from the viewing side with a third polarizing plate protection film, a polarizer, and a fourth polarizing plate protection film,
the second polarizing plate protection film has a film thickness of 30 to 60 μm and has a structure resulting from laminating a first optically anisotropic layer comprising a polymer having a positive intrinsic birefringence, and a second optically anisotropic layer comprising a polymer having a negative intrinsic birefringence, and
the film thickness of the first polarizing plate protection film, the third polarizing plate protection film, and the fourth polarizing plate protection film are each 15-25 μm.

2. The IPS mode liquid crystal display device according to claim 1, wherein the second polarizing plate protection film satisfies, with regard to Ro and Rth each represented by the following Mathematical Formula (1) and Mathematical Formula (2), $$Ro=(nx-ny)\times d[\text{nm}] \quad \text{Mathematical Formula (1)}$$

$$Rth=\{(nx+ny)/2-nz\}\times d[\text{nm}] \quad \text{Mathematical Formula (2)}$$

(in the formulae, nx represents in-plane refractive index in the slow axis direction of the film, ny represents in-plane refractive index in the fast axis direction of the film, nz represents refractive index in the thickness direction of the film, and d represents the thickness (nm) of the film; the refractive index is measured at wavelength of 590 nm under environment of 23° C. and 55% RH),
the following relationship $$100 \text{ nm} \leq Ro \leq 140 \text{ nm}$$

$$-40 \text{ nm} \leq Rth \leq 0 \text{ nm}.$$

3. The IPS mode liquid crystal display device according to claim 1, wherein the first optically anisotropic layer satisfies the following relationship with regard to Ro and Rth each represented by the following Mathematical Formula (1) and Mathematical Formula (2), $$Ro=(nx-ny)\times d[\text{nm}] \quad \text{Mathematical Formula (1)}$$

$$Rth=\{(nx+ny)/2-nz\}\times d[\text{nm}] \quad \text{Mathematical Formula (2)}$$

(in the formulae, nx represents in-plane refractive index in the slow axis direction of the film, ny represents in-plane refractive index in the fast axis direction of the film, nz represents refractive index in the thickness direction of the film, and d represents the thickness (nm) of the film; the refractive index is measured at wavelength of 590 nm under environment of 23° C. and 55% RH), $$-10 \text{ nm} \leq Ro \leq 10 \text{ nm}$$

$$80 \text{ nm} \leq Rth \leq 120 \text{ nm}.$$

4. The IPS mode liquid crystal display device according to claim 1, wherein the second optically anisotropic layer satisfies the following relationship with regard to Ro and Rth each represented by the following Mathematical Formula (1) and Mathematical Formula (2), $$Ro=(nx-ny)\times d[\text{nm}] \quad \text{Mathematical Formula (1)}$$

$$Rth=\{(nx+ny)/2-nz\}\times d[\text{nm}] \quad \text{Mathematical Formula (2)}$$

in the formulae, nx represents in-plane refractive index in the slow axis direction of the film, ny represents in-plane refractive index in the fast axis direction of the film, nz represents refractive index in the thickness direction of the film, and d represents the thickness (nm) of the film; the refractive index is measured at wavelength of 590 nm under environment of 23° C. and 55% RH), $$100 \text{ nm} \leq Ro \leq 160 \text{ nm}$$

$$-140 \text{ nm} \leq Rth \leq -80 \text{ nm}.$$

5. The IPS mode liquid crystal display device according to claim 1, wherein the polymer having a positive intrinsic birefringence is a cellulose ester resin substituted with an acyl group with 2 to 4 carbon atoms, or an acyl group with 2 carbon atoms and an acyl group with 3 to 4 carbon atoms in which the total substitution degree of acyl group is between 1.0 and 2.4 and the total carbon atom number of the acyl substituent group is 4.4 or more.

6. The IPS mode liquid crystal display device according to claim 1, wherein the first optically anisotropic layer comprises an acryl polymer with a weight average molecular weight (Mw) of 500 to 30000.

7. The IPS mode liquid crystal display device according to claim 1, wherein the polymer having a negative intrinsic birefringence comprises a constitutional unit derived from a vinyl compound and a constitutional unit derived from an aromatic maleimide.

8. The IPS mode liquid crystal display device according to claim 7, wherein mass ratio between the constitutional unit derived from a vinyl compound and the constitutional unit derived from aromatic maleimide in the polymer having a negative intrinsic birefringence is 80:20 to 95:5 (constitutional unit derived from a vinyl compound:constitutional unit derived from an aromatic maleimide).

9. The IPS mode liquid crystal display device according to claim 7, wherein the aromatic maleimide comprises N-phenylmaleimide.

10. The IPS mode liquid crystal display device according to claim 7, wherein the vinyl compound comprises styrene.

11. The IPS mode liquid crystal display device according to claim 1, wherein each of the first polarizing plate protection film, the third polarizing plate protection film, and the fourth polarizing plate protection film contains a cellulose ester resin and/or an acrylic resin.

12. The IPS mode liquid crystal display device according to claim 11, wherein each of the first polarizing plate protection film, the third polarizing plate protection film, and the fourth polarizing plate protection film comprises the acrylic resin and the cellulose ester resin at mass ratio of 95:5 to 30:70 (acrylic resin:cellulose ester resin) and also in a compatibilized state.

13. The IPS mode liquid crystal display device according to claim 1, wherein each of the first polarizing plate protection film, the third polarizing plate protection film, and the fourth polarizing plate protection film satisfies, with regard to Ro and Rth each represented by the following Mathematical Formula (1) and Mathematical Formula (2):

$$Ro = (nx - ny) \times d[nm] \quad \text{Mathematical Formula (1)}$$

$$Rth = \{(nx + ny)/2 - nz\} \times d[nm] \quad \text{Mathematical Formula (2)}$$

(in the formulae, nx represents in-plane refractive index in the slow axis direction of the film, ny represents in-plane refractive index in the fast axis direction of the film, nz represents refractive index in the thickness direction of the film, and d represents the thickness (nm) of the film; the refractive index is measured at wavelength of 590 nm under environment of 23° C. and 55% RH), $$-5 \text{ nm} \leq Ro \leq 5 \text{ nm}$$

$$-5 \text{ nm} \leq Rth \leq 5 \text{ nm}.$$

14. The IPS mode liquid crystal display device according to claim 1, wherein the first optically anisotropic layer satisfies the following relationship with regard to $Ro_{first}$ and $Rth_{first}$ each represented by the following Mathematical Formula (1) and Mathematical Formula (2), $$Ro = (nx - ny) \times d[nm] \quad \text{Mathematical Formula (1)}$$

$$Rth = \{(nx + ny)/2 - nz\} \times d[nm] \quad \text{Mathematical Formula (2)}$$

(in the formulae, nx represents in-plane refractive index in the slow axis direction of the film, ny represents in-plane refractive index in the fast axis direction of the film, nz represents refractive index in the thickness direction of the film, and d represents the thickness (nm) of the film; the refractive index is measured at wavelength of 590 nm under environment of 23° C. and 55% RH), $$-10 \text{ nm} \leq Ro_{first} \leq 10 \text{ nm}$$

$$80 \text{ nm} \leq Rth_{first} \leq 120 \text{ nm, and,}$$

wherein the second optically anisotropic layer satisfies the following relationship with regard to $Ro_{second}$ and $Rth_{second}$, $$100 \text{ nm} \leq Ro_{second} \leq 160 \text{ nm}$$

$$-140 \text{ nm} \leq Rth_{second} \leq -80 \text{ nm}.$$

* * * * *